US008643745B2

(12) United States Patent
Morioka et al.

(10) Patent No.: US 8,643,745 B2
(45) Date of Patent: Feb. 4, 2014

(54) CONTENT SHOOTING APPARATUS

(75) Inventors: Yoshihiro Morioka, Nara (JP); Kenji Matsuura, Nara (JP); Hisashi Inoue, Nara (JP); Masaaki Kobayashi, Hyogo (JP)

(73) Assignee: Panasonic Corporation, Osaka (JP)

( * ) Notice: Subject to any disclaimer, the term of this patent is extended or adjusted under 35 U.S.C. 154(b) by 509 days.

(21) Appl. No.: 12/521,865

(22) PCT Filed: Mar. 11, 2008

(86) PCT No.: PCT/JP2008/000531
§ 371 (c)(1),
(2), (4) Date: Jun. 30, 2009

(87) PCT Pub. No.: WO2008/111308
PCT Pub. Date: Sep. 18, 2008

(65) Prior Publication Data
US 2010/0091113 A1 Apr. 15, 2010

(30) Foreign Application Priority Data

Mar. 12, 2007 (JP) .................................. 2007-062445
Mar. 12, 2007 (JP) .................................. 2007-062446

(51) Int. Cl.
*H04N 5/76* (2006.01)
*H04N 5/225* (2006.01)
(52) U.S. Cl.
USPC ..................................... 348/231.3; 348/208.3
(58) Field of Classification Search
USPC .................................. 348/231.3; 386/52, 118
See application file for complete search history.

(56) References Cited

U.S. PATENT DOCUMENTS

| 5,809,202 | A | 9/1998 | Gotoh |
| 6,211,912 | B1 * | 4/2001 | Shahraray ................... 348/228.1 |
| 6,748,158 | B1 * | 6/2004 | Jasinschi et al. .............. 386/241 |
| 2003/0002715 | A1 * | 1/2003 | Kowald .......................... 382/118 |
| 2003/0095789 | A1 * | 5/2003 | Wakimoto et al. .............. 386/52 |
| 2005/0228665 | A1 | 10/2005 | Kobayashi |
| 2006/0029128 | A1 * | 2/2006 | Tahira et al. ............. 375/240.01 |

FOREIGN PATENT DOCUMENTS

| JP | 2002-142189 | 5/2002 |
| JP | 2004-362610 | 12/2004 |
| JP | 3 781 715 | 3/2006 |
| JP | 2006-165009 | 6/2006 |

OTHER PUBLICATIONS

International Search Report dated Jun. 3, 2008.

* cited by examiner

*Primary Examiner* — Joel Fosselman
(74) *Attorney, Agent, or Firm* — Dickinson Wright PLLC

(57) ABSTRACT

A content shooting apparatus is provided which is suitable for generating a digest meeting the user's desire.
A scene information generation portion detects a characteristic scene with reference to a parameter contained in either video/audio in content recorded during shooting operation information for the shooting apparatus, and generates scene information, an auxiliary information assignment portion assigns the scene information its type, priority, start time, end time, or representative time as auxiliary information in accordance with a prescribed rule, a listing portion makes a list of the scene information and the auxiliary information thereof, and a scene sorting-out portion sorts out scenes from the content with reference to the priority, such that the number of scenes is within a predetermined range.

21 Claims, 16 Drawing Sheets

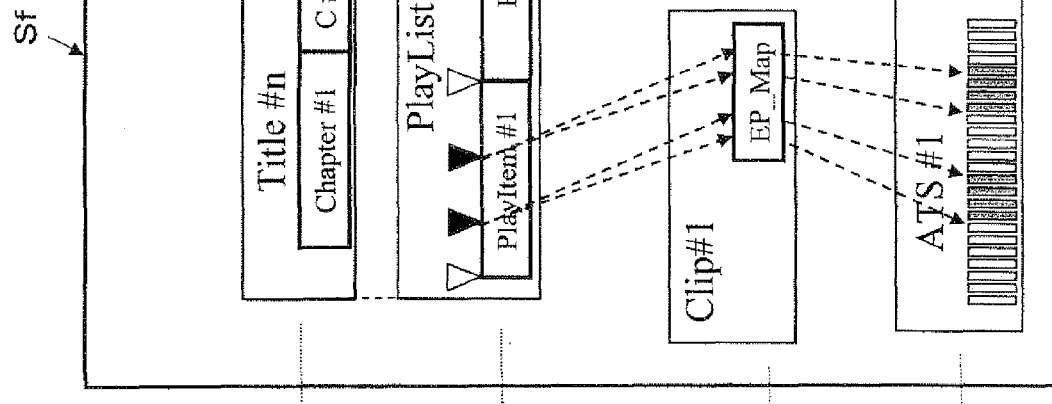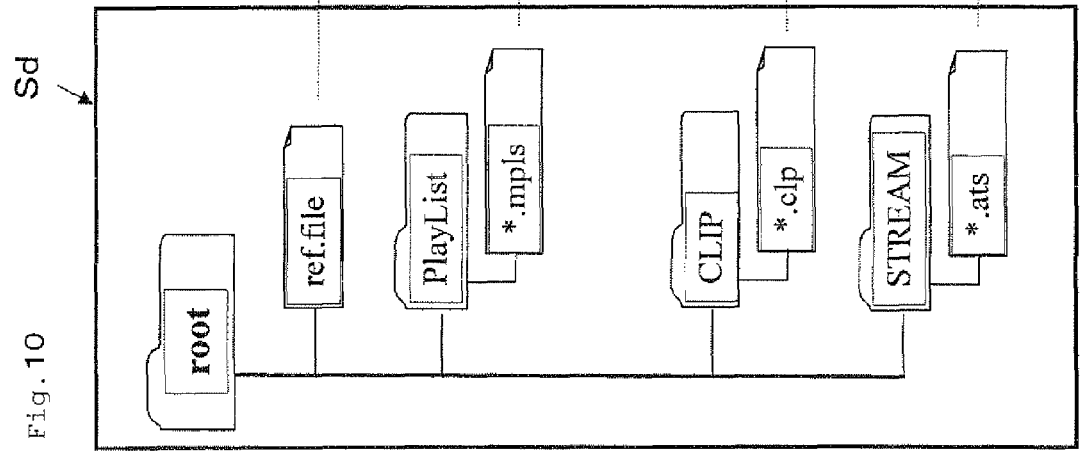
Fig. 10

CONTENT SHOOTING APPARATUS

TECHNICAL FIELD

The present invention relates to content shooting apparatuses, and more specifically to a content shooting apparatus suitable for generating a digest meeting the user's desire.

BACKGROUND ART

Conventionally, movies, television dramas, etc., have been shot in accordance with scenarios (scripts) created based on storyboards, for example. The scenario has its title (name), and consists of a plurality of scenes. Also, the scene consists of a plurality of cuts. A director provides directions in accordance with the scenario, and performers, such as actors, actresses, and extras, act in accordance with descriptions in the scenario. In the cases of, for example, live stage acts and concerts, performance is carried out in order of scenes specified in the scenario.

On the other hand, in the cases of movies, dramas, etc., shooting is rarely carried out in order of scenes specified in the scenario.

Metadata generation and editing in conventional art will be described. Well-known metadata input methods and edit systems include those described in Patent Document 1. Specifically, when generating content-related metadata or tagging content with metadata, keywords, which have been previously extracted from, for example, the scenario for the created content, are inputted by voice. Thereafter, a dictionary genre and the priority order of the keywords are determined in accordance with the scenario, and the metadata is generated by voice recognition means. This method employs voice recognition to allow efficient metadata assignment, even if the metadata is assigned at intervals of a few seconds, which is difficult to achieve by key input. The metadata can also be used as a keyword(s) for scene search.

In addition, a device for analyzing scenario information, as described in Patent Document 2, is known. This device includes a scenario information storage portion, a reference information storage portion, a calculation portion, and an output portion. The information storage portion stores scenario information sorted by scene. The reference information storage portion stores reference information concerning data contained in the scenario information. The calculation portion extracts data from the scenario information, and calculates output information based on the extracted data and the reference information before outputting to the output portion.

Based on data contained in the scenario and reference information related to that data, the scenario information analyzing device thus configured is capable of automatically calculating and outputting output information, such as an appropriate shooting schedule, as well as analyzing the scenario information. Thus, it is possible to shorten a time period for arranging a shooting schedule, as well as to expeditiously complete shooting by carrying out the shooting in accordance with the outputted shooting schedule, making it possible to reduce the cost of shooting.

Patent Document 1: Japanese Patent No. 3781715
Patent Document 2: Japanese Laid-Open Patent Publication No. 2004-362610

DISCLOSURE OF THE INVENTION

Problem to be Solved by the Invention

In conventional methods, apparatuses, and systems, as typified by Patent Documents 1 and 2, metadata is generated by camerawork patterns, such as panning and zooming, recorded sound, user operations, etc., at characteristic scenes between the start and the end of clip recording during shooting of moving images. The generated metadata is listed.

After the end of the clip recording, a digest consisting of related clips can be generated using metadata in the list. Although depending on the substance of content, in general, a content digest is desirably one-third or less of the entire content (original shooting length). However, in the above-described method, depending on the content, the number of pieces of metadata generated tends to be enormous, so that a generated digest might contain a half or more of the shot content. In such a case, the generated digest is excessively long to be called a digest. The cause of this is that in the conventional configuration, when a digest is generated based on shot content, it is not possible to narrow down the numbers of scenes and clips to be included in the digest.

Furthermore, users' desires regarding digest generation are often made from various aspects. Specific examples include digests focusing on camerawork, sound, or user button input, digests created in desired length, and digests only composed of clips full of characteristic scenes (e.g., mainly composed of high-priority clips) selected from shot clips. However, in the conventional art, digests meeting such desires as preferred by users cannot be generated automatically.

In view of the problem as mentioned above, an objective of the present invention is to provide a content shooting apparatus suitable for generating a digest meeting the user's desire.

Means for Solving the Problem

To achieve the objective mentioned above, the present invention provides a first content shooting apparatus for recording content containing video, audio, or data onto a recording medium, in combination with scene information for the content, and accessing a specific scene in the content with reference to the scene information, the apparatus comprising:

scene information generation means for detecting a characteristic scene with reference to a parameter contained in either video/audio information recorded during shooting or operation information for the shooting apparatus, and generating the scene information;

auxiliary information assignment means for assigning the scene information its type, priority, start time, end time, or representative time as auxiliary information in accordance with a prescribed rule;

listing means for making a list of the scene information and the auxiliary information thereof; and scene sorting-out means for sorting out scenes from the content with reference to the priority after a recording operation to the recording medium, such that the number of scenes is within a predetermined range.

Here, the scene sorting-out means preferably includes at least one of high priority scene sorting-out means for sorting out the scene information in descending order of priority and low priority scene sorting-out means for sorting out the scene information in ascending order of priority.

The high priority scene sorting-out means preferably sorts out high priority scenes from shot content having removed therefrom scenes sorted out by the low priority scene sorting-out means.

Also, the first content shooting apparatus preferably further comprises:

means for setting a method for selecting the scene information;

second-type priority means for computing a combination of plural pieces of scene information on the list in accordance with an arithmetic system determined by the setting means, and assigning second-type priority to the scene information;

auxiliary information, assignment means for assigning auxiliary information to the scene information, the auxiliary information being at least one of start time, end time, and representative time of a characteristic scene with the second-type priority; and second-type priority list generation means for sorting out scene information from the list in descending order of second-type priority, such that the number of pieces of scene information is within a predetermined range, and generating a second-type priority list.

Here, the apparatus preferably further comprises second-type priority listing means for providing the second-type priority list to a file to be referenced for playing back the shot content.

The first content shooting apparatus preferably further comprises skip means for referencing the second-type priority list at the time of playback to skip from the start point, representative point, or end point of the characteristic scene to a referenced point.

The first content shooting apparatus preferably further comprises scene playback means for playing back characteristic scene sections in a specified order with reference to the second-type priority list.

The first content shooting apparatus preferably further comprises ticker display means for providing descriptions about characteristic scenes in characteristic scene sections, the descriptions being superimposed on playback video as tickers while playing back the characteristic scene sections in a specified order.

The first content shooting apparatus preferably further comprises:

digest scheme specification means for receiving a specification of at least one of the following items concerning characteristic scenes to be included in a digest: priority, type, digest time length, and content-to-digest reduction ratio;

means for generating the file to be referenced for playback in accordance with a digest generation scheme specified by the digest scheme specification means, while referring to the second-type priority list, which is auxiliary data for the file to be referenced for playback; and registration means for registering the file to be referenced for playback on a list of the content.

The first content shooting apparatus preferably further comprises ticker display means for providing descriptions about characteristic scenes in characteristic scene sections, the descriptions being superimposed on playback video as tickers while playing back the characteristic scene sections with reference to the file to be referenced for playback.

The first content shooting apparatus preferably further comprises:

digest scheme specification means for receiving a specification of at least one of the following items concerning characteristic scenes to be included in a digest: priority, type, digest time length, and content-to-digest reduction ratio; and file generation means for generating a file containing a collection of specified characteristic scenes in accordance with a digest generation, scheme specified by the digest scheme specification means, while referring to the second-type priority list, which is auxiliary data for the file to be referenced for playback.

The first content shooting apparatus preferably further comprises:

digest scheme specification means for receiving a specification of at least one of the following items concerning characteristic scenes to be included in a digest: priority, type, digest time length, and content-to-digest reduction ratio; and playback means for playing back a string of unspecified characteristic scene sections in accordance with a digest generation scheme specified by the digest scheme specification means, while referring to the second-type priority list, which is auxiliary data for the file to be referenced for playback.

The first content shooting apparatus preferably further comprises:

digest scheme specification means for receiving a specification of at least one of the following items concerning characteristic scenes to be included in a digest: priority, type, digest time length, and content-to-digest reduction ratio; and file generation means for generating a file obtained by collecting shot sections not specified at the time of playback, in accordance with a digest generation scheme specified by the digest scheme specification means, while referring to the second-type priority list, which is auxiliary data for the file to be referenced for playback.

The first content shooting apparatus preferably further comprises playback means for performing playback with reference to the second-type priority list, which is auxiliary data for the file to be referenced for playback, such that sections specified at the time of playback are played back at normal speed, and shot sections not specified at the time of playback are played back at a "playback speed changed from normal" or with "playback video being additionally processed".

The first content shooting apparatus preferably further comprises playback/display means for playing back shot video in slow motion, at high speed, in skip mode, or in still image display mode, wherein the playback is performed at the "playback speed changed from normal".

The first content shooting apparatus preferably further comprises video generation means for generating video by removing any horizontal and vertical jiggle due to camerawork from shot video, wherein the playback is performed with the "playback video being additionally processed".

The first content shooting apparatus preferably further comprises:

file generation means for generating a file to be referenced for playing back a recommendation based on the file to be referenced for playback registered on the list of the content, the file to be referenced for recommendation playback consisting of scenes at a predetermined priority level or higher or scenes taken by specific camerawork; and registration means for registering the file to be referenced for recommendation playback with a recommended playback object list.

The first content shooting apparatus preferably further comprises:

means for generating background music when playing back the file to be referenced for playback registered on the playback object list; and alteration means for changing the background music in at least one of melody, tone, and tempo around immediately before switching characteristic scenes in the file to be referenced for playback.

Furthermore, to achieve the objective mentioned above, the present invention provides a second content shooting apparatus for recording content containing video, audio, or data onto a recording medium, in combination with metadata, and accessing a specific portion of the content denoted by the metadata, the apparatus comprising:

a standard camerawork presence probability list generated based on an expected occurrence rate for a camerawork type prescribed for each type of events to be shot;

camerawork detection means for detecting camerawork at predetermined time intervals and counting occurrences of the detected camerawork;

camerawork count comparison means for comparing the count of the detected camerawork with the expected occurrence rate for the camerawork; and beyond-range expected occurrence rate notification means for generating a signal indicating a beyond-range expected occurrence rate when the count of the detected camerawork is out of the range of the expected occurrence rate for the camerawork.

The second content shooting apparatus preferably further comprises shooting assist means for generating a message prompting camerawork control within the range of the expected occurrence rate, in response to the signal indicating the beyond-range expected occurrence rate.

The second content shooting apparatus preferably further comprises:

metadata generation means for detecting an event based on a parameter contained in either information concerning video, audio, and shooting operation, or control information in a shooting environment during shooting, or based on a change of the parameter, and generating metadata for the event;

assignment means for assigning an attribute to the metadata in accordance with a prescribed rule, the attribute being at least a type of the event, a priority level of the event, or a start time, end time, and representative time of the event;

listing means for listing metadata with the attribute;

metadata sorting-out means for sorting out the listed metadata in descending order of priority after a recording operation to the recording medium, such that the number of pieces of metadata is within a predetermined range; and recording means for recording a list of metadata sorted out by the metadata sorting-out means onto the recording medium The second content shooting apparatus preferably further comprises:

camerawork generation means for computing a temporal change in at least one of the following shooting apparatus operations and generating camerawork: panning, tilting, zooming in, zooming out, forward-backward movement, rightward-leftward movement, and vertical movement; and camerawork registration means for registering an output from the camerawork generation means as a prescribed type of camerawork for each type of events to be shot.

The second content shooting apparatus preferably further comprises saving means for holding in advance as reference data an expected occurrence rate for camerawork to occur in at least one of the following events to be shot: athletic meet, entrance ceremony, graduation ceremony, trip, recital, wedding ceremony, sports, indoor event, and outdoor event.

Also, the shooting assist means preferably includes at least one of the following shooting assist algorithms: shooting assist algorithm for zooming out to induce fixed shots when most shooting operations are performed in zooming-in mode; shooting assist algorithm for inducing fixed shots when most shooting operations are performed in zooming and panning modes; and shooting assist algorithm for inducing movement, panning, and zooming when most shooting operations are fixed shots performed at fixed points.

Effect of the Invention

The content shooting apparatus of the present invention makes it relatively easy to generate a digest as preferred by the user.

BRIEF DESCRIPTION OF THE DRAWINGS

FIG. 10 is a diagram for explaining a directory structure and a file structure.

BEST MODE FOR CARRYING OUT THE INVENTION

First Embodiment

In a first embodiment of the present invention, content shooting apparatus is provided, capable of narrowing down the number of pieces of metadata in descending or ascending order of priority, thereby readily generating a digest with reduced numbers of scenes and, clips, or automatically generating a preferable digest.

The operation of the content shooting apparatus according to the first embodiment of the present invention will be described with reference to FIG. 1. Specifically, an exemplary system model will be described, which generates video data, audio data, and metadata on a recording medium (or a buffer memory) in a camera 101 acting as a content shooting apparatus, and provides a function of playing back a digest with reference to the metadata.

Figure 1:
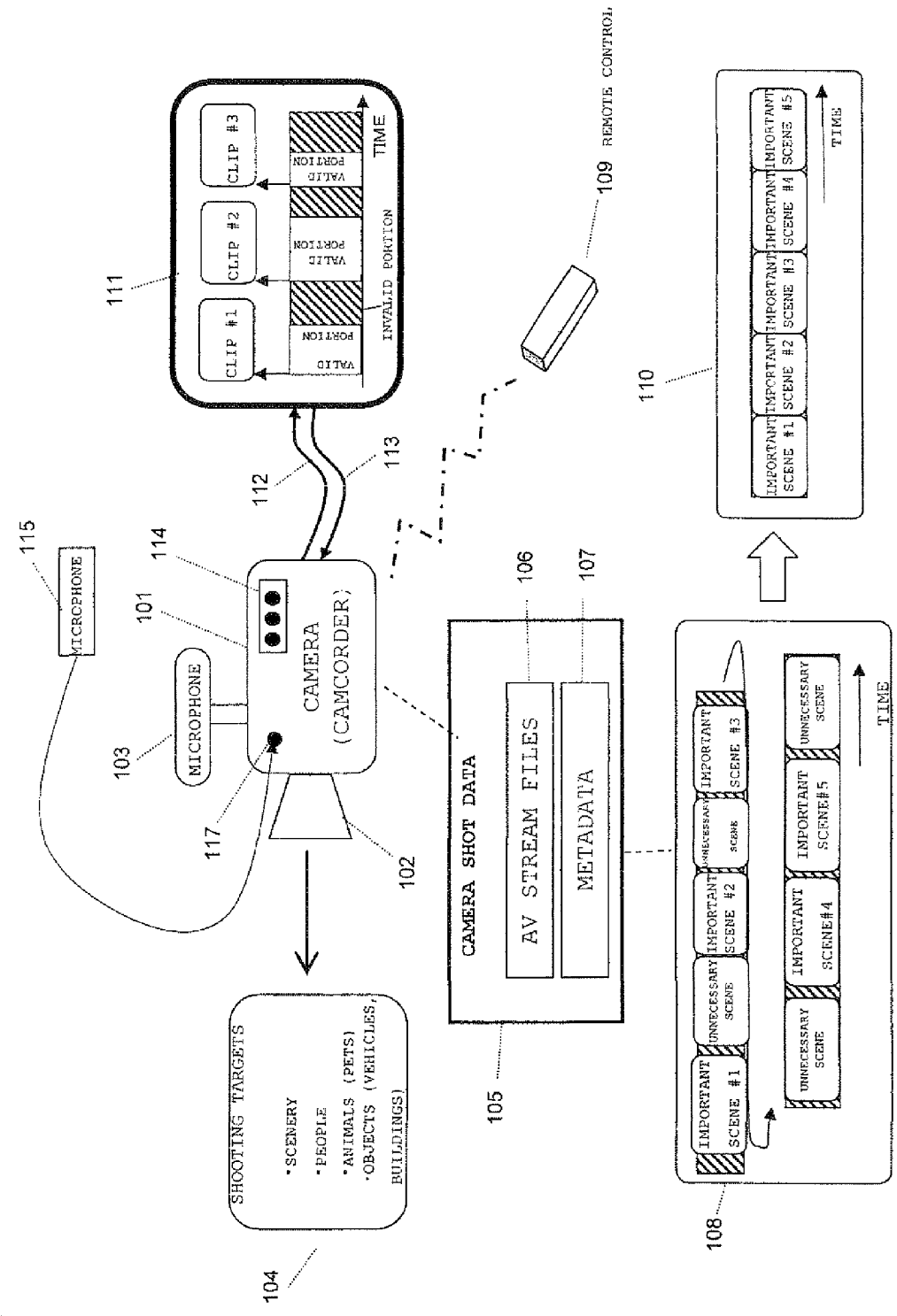
FIG. 1 is a model diagram of a content shooting apparatus according to a first embodiment of the present invention.

In FIG. 1, reference numerals 101, 102, 103, and 104 respectively denote a camera, a lens portion of the camera 101, a microphone of the camera 101, and shooting targets of the camera 101. Note that the shooting targets 104 are, for example, scenery, people, animals, such as pets, vehicles, and buildings.

Reference numerals 114 and 105 respectively denote metadata input buttons and data shot by the camera 101. The camera shot data 105 contains AV stream files 106 and metadata 107. The AV stream files 106 contain metadata. The metadata 107 is shot scene information concerning scene numbers, cut numbers, take numbers, as well as acceptance, rejection, abeyance, etc., of the recorded takes. Reference numeral 109 denotes a remote control for the camera 101. The user operates the metadata input button portion 114 and the remote control 109 to input the metadata 107 to the camera 101. Note that an image sensor used for the camera 101 is preferably a CCD or C-MOS sensor.

Reference numeral 108 denotes a data sequence shot by the camera 101. In the data sequence 108, video data, audio data, and the metadata 107 are arranged on the time axis. The metadata 107 is handled as character data in text format, but may be binary format data.

Content shot during a period from the start to the end of shooting, or a period from the start to a pause of shooting, is defined herein as a clip. The data sequence 108 contains clips #1 to #5 in a specific scene. Reference numeral 110 denotes a data sequence including the clips #1 to #5 joined by editing.

Reference numeral 111 denotes a television set connectable to the camera 101. Reference numeral 112 denotes a connection cable for transmitting a signal from the camera 101 to the television set 111, and reference numeral 113 denotes a connection cable for transmitting a signal from the television set 111 to the camera 101. The user operates the remote control 109 at a location away from the camera 101 to display on the television set 111 via a signal cable 112 content or a digest (or a content summary) with any unnecessary portions being deleted.

Reference numeral 115 denotes a microphone for detecting audio and inputting the detected audio to the camera 101 as an audio signal, as in the microphone 103. Reference numeral 117 denotes a microphone included in the camera 101. Note that while the microphones 103 and 117 are directly connected to the camera 101 to record audio near the camera 101, the microphone 115 is connected to the camera 101, for example, via a cable, and used to record audio away from the camera 101. As will be described later, an optical sensor may be used instead of using the microphone 115.

A list displayed on the television set 111 will be briefly described. On the screen of the television set 111, a valid portion (valid scene) and an invalid portion (invalid scene) of each clip are displayed with the horizontal axis denotes the passage of time.

Examples of the valid portion include:
fixed scenes after panning or zooming; and
scenes characterized by sound, such as cheers or handclaps.

On the other hand, examples of the invalid portion include:
scenes with highly blurred (generally "unstable") images caused by camera jiggle;
out-of-focus scenes, scenes shot with excessively quick panning/tilting/zooming;
scenes with screen images darkened by backlight;
scenes with acoustic howling;
scenes shot by pointing at the ground; and
scenes taken with a cap on the camera.

In the example shown in FIG. 1, the three valid portions in the list displayed on the television set 111 are presented on the screen as their respective representative clips with their respective thumbnails. Each of these representative clips may be the first frame of its valid portion, or a representative frame within the valid portion. In addition, their valid portions and invalid portions are assigned their respective priorities, so that a digest can be generated by selecting only scenes with a specific priority.

The metadata input button portion 114 is preferably composed of three buttons. The user can operate the metadata input button portion 114 at an important scene during camera shooting to mark the important shot scene (clip) (hereinafter, referred to as a "marking function"). The mark indicating an important clip is also metadata 107, and by using the metadata 107, it becomes possible to quickly call up a marked clip (video of the first frame or a representative frame of a clip, or thumbnail video of such a frame) by mark search after shooting. The three buttons in the metadata input button portion 114 are used in a manner such as the first button for registering important clips, the second button for mode switching to allow button operations and activate character input mode, and third button for canceling registrations.

It is also possible to switch the mode so that an important clip is registered, which corresponds to a period for which the first button is being held. Furthermore, it is also possible to switch the mode so that an important clip is registered, which corresponds to five seconds before and after the time of pressing the first button, or fifteen seconds in total, i.e., five seconds before and ten seconds after the time of pressing the first button. With the three buttons, a number of functions can be realized by combining the type of the button to be pressed with the timing and the length of pressing.

The shot scene information inputted as the metadata 107 is correlated with a clip time code (e.g., a time code represented by 32 bits at a clock frequency of 27 MHz). The metadata 107 correlated with the time code is further electronically correlated with the sound of a clapperboard and recorded content within the body of the camera 101, thereby generating new metadata 107. As a result, naturally, it is possible to immediately access the time at which the clapperboard was clapped, and it is also possible to readily perform deletion of unnecessary data recorded before the time of clapping the clapperboard, as well as rearrangement of scenes and cuts deemed "accepted". For example, in the case of shooting in an athletic meet, it is possible to quickly call up a frame image at the beginning of, for example, a footrace (sprint race), a long-distance race, such as relay, a tug of war, or a ball-shooting race.

The user can designate the start position (time) and the end position (time) of each clip or the length thereof based on a sequence of a material shot by the camera, thereby rearranging the clips. Also, in the case where a clip is displayed on a TV monitor, it is possible to designate as representative video of the clip the most characteristic frame in the clip, such as frame (or field) video from the beginning, or any point subsequent thereto, to the end of the clip or fixed images, for example, before and after panning or zooming.

Also, it is possible that button operations for recording, pausing, and stopping the movie, as well as shooting target-related information, such as the voice of the shooter detected by the microphone 115, can be registered as metadata correlated (marked) with a specific clip time code. Specific examples include the time of shooting (e.g., date and morning, afternoon, evening, or night) as described above, a shooting method (e.g., lens, camera, shot, and light source), event participants (e.g., line of vision, movement, facial expression, emotional level, makeup, and costume), dialogues (e.g., improvisational keywords), and audio (sound), as well as content shooting-related information such as points of attention.

Figure 2:
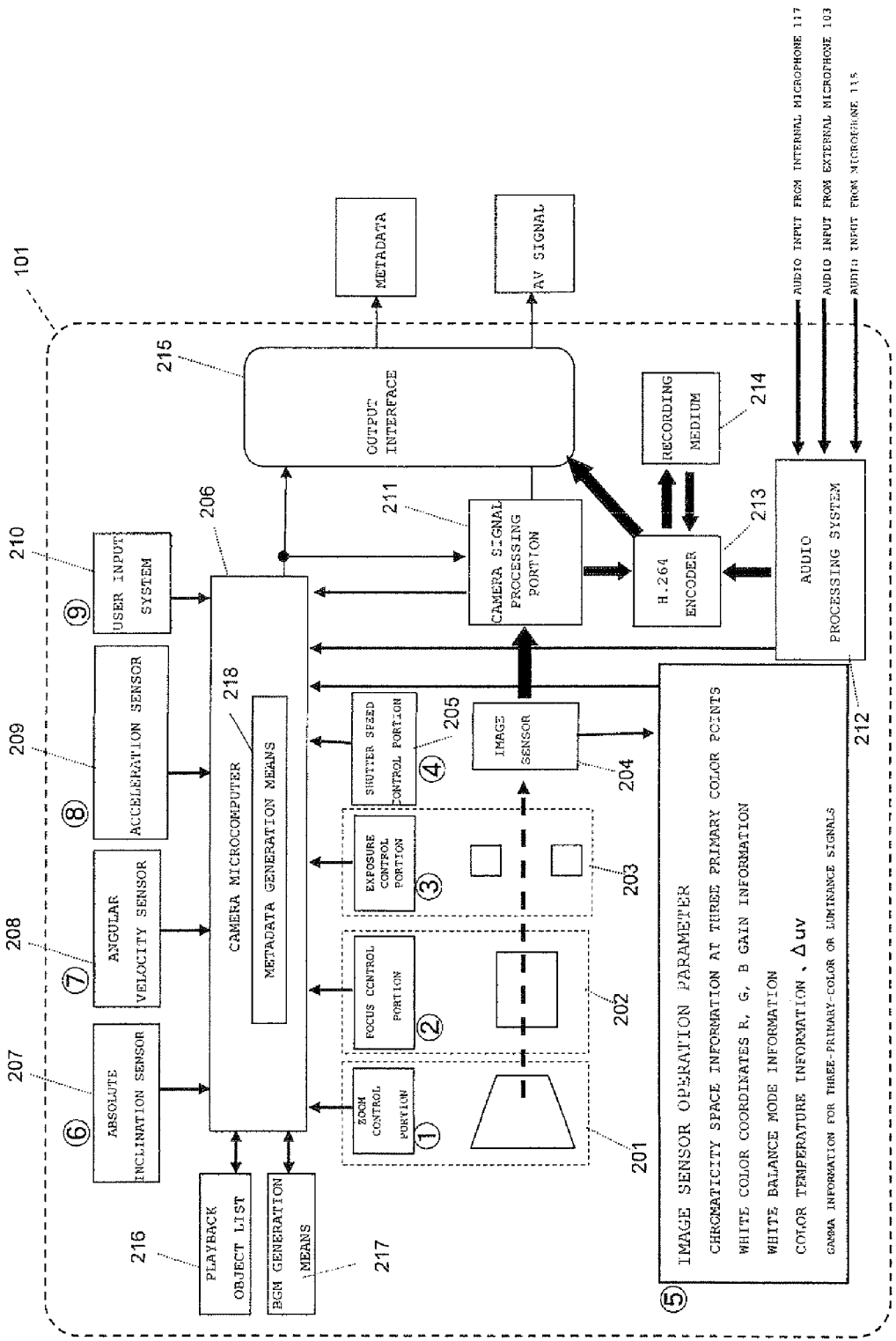
FIG. 2 is a diagram for explaining the internal configuration of a camera shown in FIG. 1.

Next, the internal configuration and operation of the camera 101 will be described with reference to FIG. 2. Provided in the camera 101 are a zoom control portion 201, a focus control portion 202, an exposure control portion 203, an image sensor 204, a shutter speed control portion 205, a camera microcomputer 206, an absolute inclination sensor 207, an angular velocity sensor 208, a forward-backward/rightward-leftward/upward-downward acceleration sensor 209, a user input system 210, a camera signal, processing portion 211, an audio processing system 212, an H.264 encoder 213, a recording medium 214, and an output interface 215.

The camera microcomputer 206 includes scene information generation means (metadata generation means) 218 for detecting unnecessary scenes and important scenes. The detection of unnecessary scenes and important scenes is realized by subjecting data concerning panning, tilting, zooming, focus, audio input level, etc., of the imaging apparatus to arithmetic operations specific thereto.

The zoom control portion 201 controls a zooming operation of the lens portion 102. The focus control portion 202 controls a focus operation of the lens portion 102. The exposure control portion 203 controls an exposure adjustment operation of the lens portion 102. The shutter speed control portion 205 controls a shutter speed adjustment operation of the image sensor 204. The absolute inclination sensor 207 detects horizontal/vertical absolute inclinations of the camera 101. The angular velocity sensor 208 detects horizontal/vertical angular velocities of the camera 101. The acceleration sensor 209 detects forward-backward/rightward-leftward/upward-downward accelerations of the camera 101.

The user input system 210 generates an instruction signal in response to a user operation on a button or suchlike. The camera signal processing portion 211 performs processing, such as pixel defect correction and gamma correction, on image data taken by the image sensor 204 in units of pixel or in units of block consisting of a plurality of pixels. The audio processing system 212 accepts inputs from the internal microphone 117, the external microphone 103, or the microphone 115.

The H.264 encoder 213 compresses image data generated by the camera signal processing portion 211 and audio data generated by the audio processing system 212, thereby generating an AV signal. In addition, the H.264 encoder 213 detects sound of a clapperboard from audio inputted to the audio processing system 212, thereby generating detected clapperboard sound metadata. The AV signal generated by the H.264 encoder 213 and the metadata generated by the camera microcomputer 206 are stored into the recording medium 214, and outputted via the output interface 215.

A playback object list 216 is generated by combining titles of files included in PlayList and CLIP folders as illustrated with an exemplary shot content file configuration to be described later (FIG. 10). A background music generation means 217 generates background music when playing back content obtained by partially extracting some shot regions of shot content. For example, short music files, such as an introduction of five seconds, a first melody of ten seconds, a second melody (chorus) of fifteen seconds, and an ending (5 sec.), can be combined at the time of playback so as to approximate the time length of content to be played back. Note that music files may be in a commonly used format, such as WAVE, MP3, or MIDI. Also, the background music generation means 217 has a function of changing the melody, tone, tempo, etc., of the background music so as to match characteristic scenes in content being played back.

As an operation parameter, the image sensor 204 has image sensor operation data concerning at least one of the following: chromaticity space information at three primary color points; white color coordinates; gain information concerning at least two of the three primary colors; color temperature information; Δuv (delta uv); and gamma information concerning a three-primary color signal or a luminance signal. In the present embodiment, chromaticity space information at three primary color points, gain information concerning R (red) and B (blue) from among the three primary colors, and gamma curve information concerning G (green) are handled by way of example as metadata. Note that if the chromaticity space information at three primary color points is known, it is possible to know the range in which color reproduction in a color space is possible. In addition, if the gain information concerning R (red) and B (blue) from among the three primary colors is known, it is possible to know color temperatures. Furthermore, if the gamma curve information concerning G (green) is known, it is possible to know half-toning characteristics. A sensor dedicated to color temperature detection may be provided such that the color temperature information is received from that sensor.

Lens zooming information, lens focus information, lens exposure information, image sensor shutter speed information, horizontal/vertical absolute inclination information, horizontal/vertical angular velocity information, forward-backward/rightward-leftward/upward-downward acceleration information, information concerning buttons used by the user for input, information concerning scene numbers, cut numbers, and take numbers, as well as acceptance, rejection, abeyance, etc., of the recorded takes, the chromaticity space information at three primary color points, the gain information concerning R (red) and B (blue) from among the three primary colors, and the gamma curve information concerning G (green) are handled by the camera microcomputer 206 as metadata 107.

Next, metadata to be generated in the camcorder 101 will be described with reference to FIG. 3. The metadata is generally classified into real-time-based metadata (real-time metadata) and non-real-time-based metadata (non-real-time metadata). Real-time metadata that is mapped to SEI in an H.264 stream includes, for example:
  metadata associated with AV content shot by a camera, such as a camcorder;
  metadata obtained by converting general data into metadata format;
  metadata obtained from SI (service information) in digital broadcasting;
  metadata, such as EPG information, obtained from EPG providers; and
  metadata, such as EPGs, obtained from the Internet.

Figure 3:
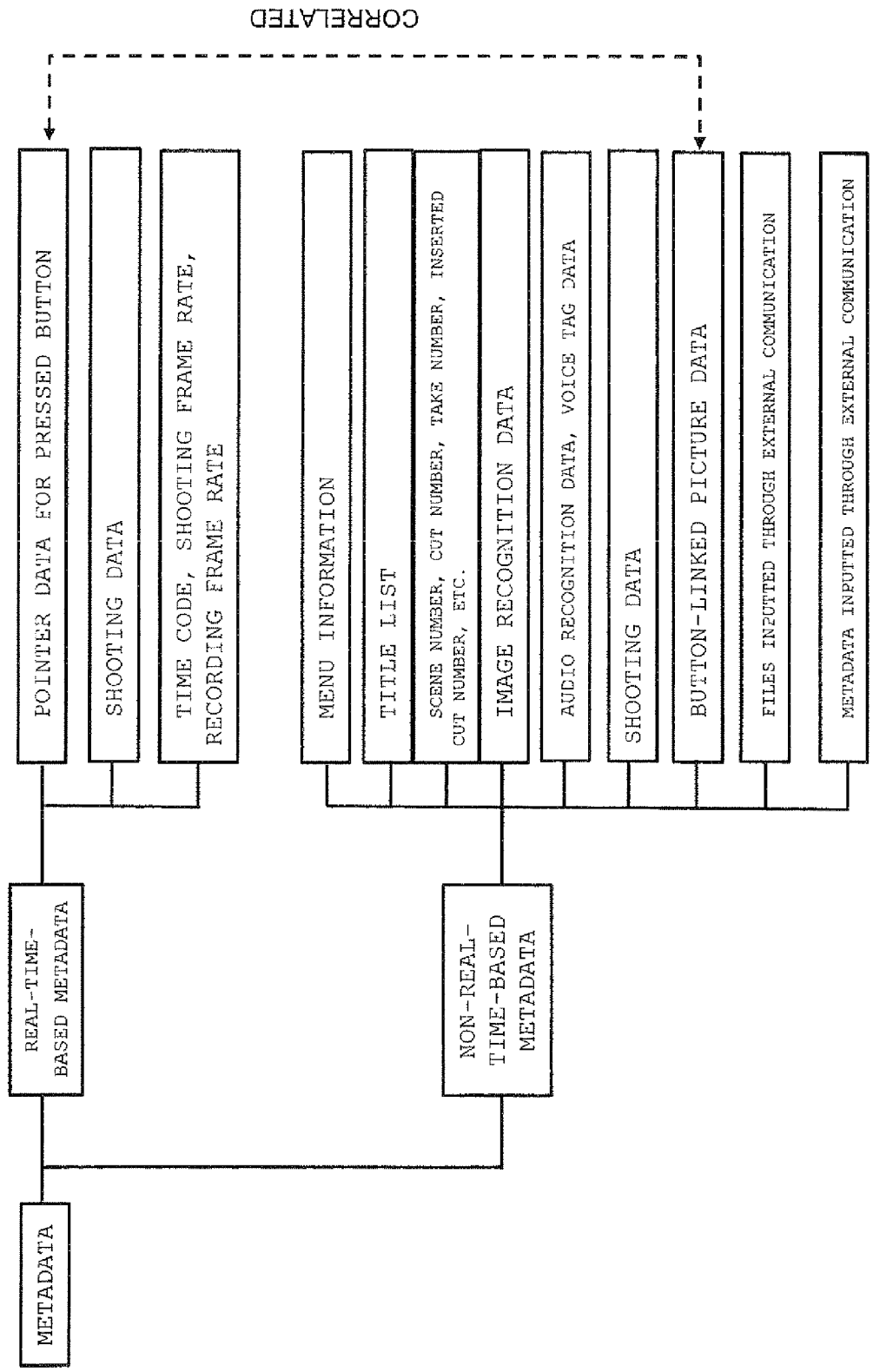
FIG. 3 is a diagram illustrating exemplary metadata classification.

As shown in FIG. 3, examples of the real-time metadata associated with AV content shot by a camera include:
  information specifying buttons pressed by the user at important scenes (by which identification information, such as pointer data and numbers, can be assigned);
  shooting data,
  the imaging data concerning image sensor operation mode, backlight correction, aperture/exposure information, focus, shutter speed information, color temperature, white balance, zooming, elevation angle, shooting or not shooting of the ground, unstable jiggling, blurring, pan/tilt/zoom (abbreviated as "PTZ") status, acoustic howling status, camera-capclosed status, and camera posture status (horizontal/vertical absolute inclination information, horizontal/vertical angular velocity information, forward-backward/rightward-leftward/upward-downward acceleration information, etc.);

time codes (video frames, audio frames); and video and audio format information, such as shooting frame rate, recording frame rate, etc.

In addition, as shown in FIG. 3, non-real-time metadata includes, for example:

menu information;

a title list (representative events, events registered by the user);

scene numbers, cut numbers, take numbers, inserted cut numbers, information concerning acceptance, rejection, abeyance, etc., of recorded takes;

luminance and color information for video blocks;

image recognition data (detection and recognition of faces, people, pets, etc.);

audio input levels (maximum input levels for a designated channel (ch) during prescribed periods).

audio recognition data;

imaging system operation data, such as chromaticity space information at three primary color points of the image sensor, white color coordinates, gain information concerning at least two of the three primary colors, color temperature information, and Δuv (delta uv);

files inputted through external communication (texts, such as scenarios, which have been inputted as XML or binary data files via an external interface);

gamma information for three-primary-color or luminance signals;

still images; and thumbnails.

Of the above-described metadata, any necessary data is selected for use. The metadata can be described in the formats of property or attribute as adopted by UPnP and UPnP-AV. Such description formats are open to the public on http://upnp.org, and an efficient operation can be achieved by designing, considering use of text and XML (Extensible Markup Language).

Note that in order for a shooter of moving images or the like, a content creator, or a content copyright owner, to add value to each piece of metadata and collect viewing fees from content users depending on their usage details and content viewing frequencies, value-adding metadata can be associated with that piece of metadata. For each piece of metadata, the value-adding metadata may be provided as an attribute of target metadata or as an individual property.

Exemplary information related to recording equipment and recoding conditions will be described below. If metadata generated and registered by a shooter of camcorder manufacturer discrimination ID, device type discrimination ID and moving images or the like, a content creator, or a content copyright owner are highly valuable, and therefore the necessity of licensing is considered, any feature for executing a process of giving a license to use the metadata through authentication can be incorporated into the configuration of the present invention, thereby making it possible to achieve an efficient operation.

In such a case, the shooter may create the shot moving image content in an encrypted file, and open the file to the public by uploading it onto a server on the Internet. It is also possible that the encrypted file is uploaded for posting, such that those who have interest in the file can purchase it. In the case where any content with a news value, such as accident video, has been recorded, the content can be auctioned among broadcast stations. By utilizing the metadata, it becomes possible to achieve efficient classification and search of an increasing amount of content.

Next, referring to FIG. 4, video compression system (H.264/AVC system) and audio compression system (AAC system) will be described by way of example with respect to each of the following methods:

real-time metadata mapping method;

method for detecting unnecessary scenes from real-time metadata; and method for detecting important scenes or mapping method for scene information (referred to as scene index, tag, or metadata).

Figure 4:
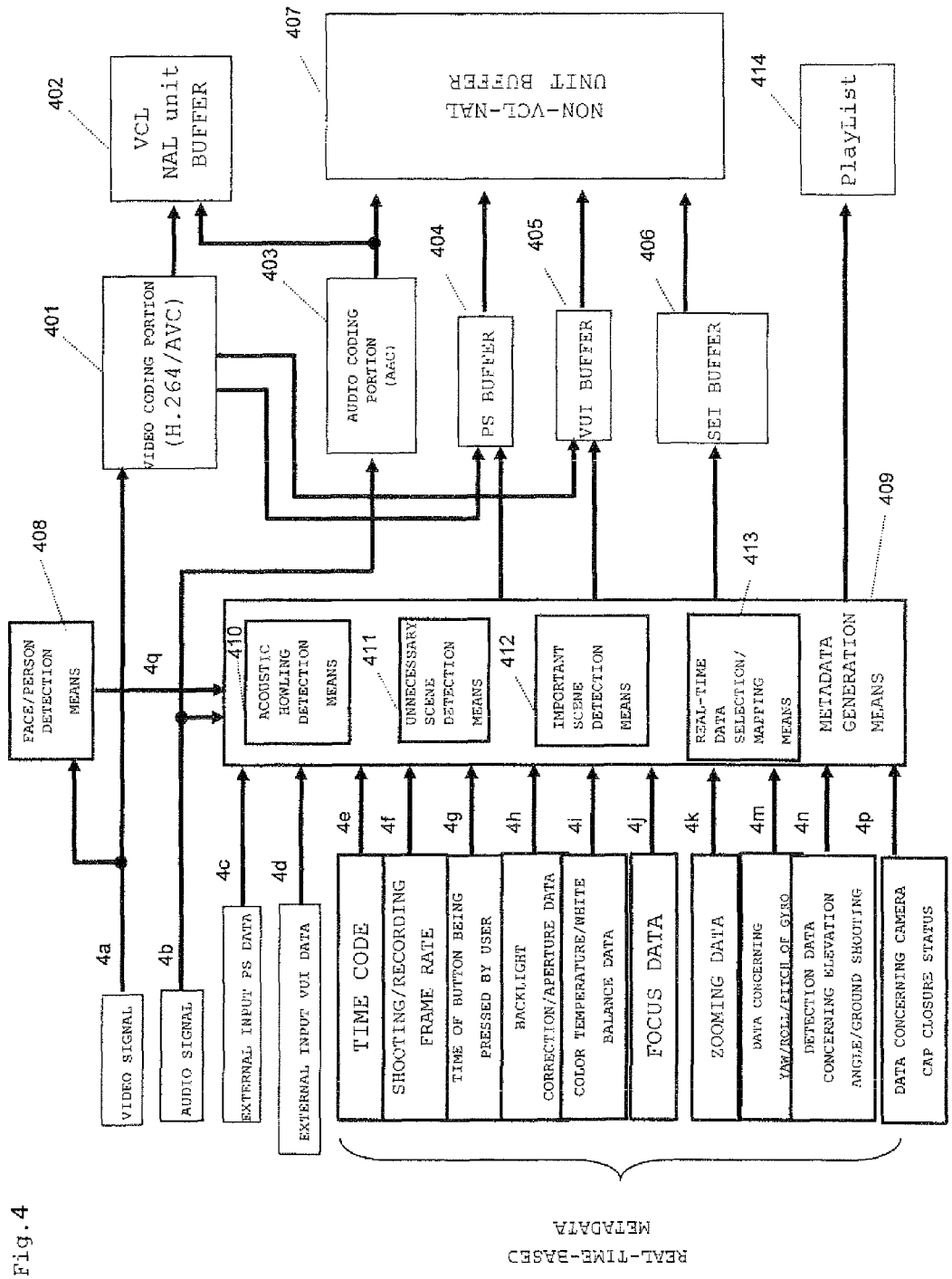
FIG. 4 is a diagram for explaining blocks for generating metadata and compressing AV signals.

FIG. 4 is a diagram illustrating in more detail blocks for generating metadata and compressing AV signals within the camera 101 of FIG. 1. In FIG. 4, reference numerals 401, 402, and 403 respectively denote a video coding portion, a VCL (Video Coding Layer)-NAL (Network Abstraction Layer) unit buffer, and an AAC audio coding portion.

Reference numerals 404, 405, 406, 407, and 408 respectively denote a PS (Parameter Set) buffer, a VUI (Video Usability Information) buffer, an SEI (Supplemental Enhancement Information) buffer, a non-VCL-NAL unit buffer, and face/person detection means.

Also, reference numeral 409 denotes scene information metadata generation means (hereinafter, abbreviated as "metadata generation means"), which includes acoustic howling detection means 410, unnecessary scene detection means 411, important scene detection means 412, and real-time data selection/mapping means 413. Reference numeral 414 denotes a PlayList.

As shown in FIG. 4, a video signal is converted into VCL-NAL unit format data by the video coding portion 401, and thereafter temporarily held in the VCL-NAL unit buffer 402. An audio signal, external input PS data and external input VUI data are converted into non-VCL-NAL unit format data respectively by the audio coding portion 403, the PS buffer 404, and the VUI buffer 405, and thereafter temporarily held in the non-VCL-NAL unit buffer 407. Similarly, real-time metadata concerning, for example, panning, tilting, zooming, focus, and audio input level (maximum input level for a designated channel (ch) during a prescribed period) of the imaging apparatus are mapped to an 3.264/AVC SEI User data unregistered SEI message, and thereafter further converted into non-VCL-NAL unit format data by the SEI buffer 406 before being temporarily held in the non-VCL-NAL unit buffer 407.

A video signal (4a) is inputted to the video coding portion 401 and the face/person detection means 408. The face/person detection means 408 performs human face detection regarding the position, size, and number, and output detection data (4q) to the scene information metadata generation means 409. An audio signal (4b) is inputted to the audio coding portion 403 and the scene information metadata generation means 409. Also, external input PS data (4c), external input VUI data (4d), a time code (4e), shooting/recording frame rate (4f), data concerning the time of any operation button being pressed by the user (4g), backlight correction/aperture data (4h), color temperature/white balance data (4i), focus data (4j), zooming data (4k), data concerning yaw/roll/pitch of a gyro sensor (4m), detection data concerning elevation angle/shooting or not shooting of the ground (4n), and data concerning the closure status of a camera lens cap (4p) are inputted to the metadata generation means 409.

The metadata generation means 409 generates scene information metadata based on various input data. The metadata generation means 409 includes acoustic howling detection means 410, unnecessary scene detection means 411, important scene detection means 412, and real-time data selection/ mapping means 413. The acoustic howling detection means 410 detects acoustic howling based on the audio signal (4b).

Figure 5:
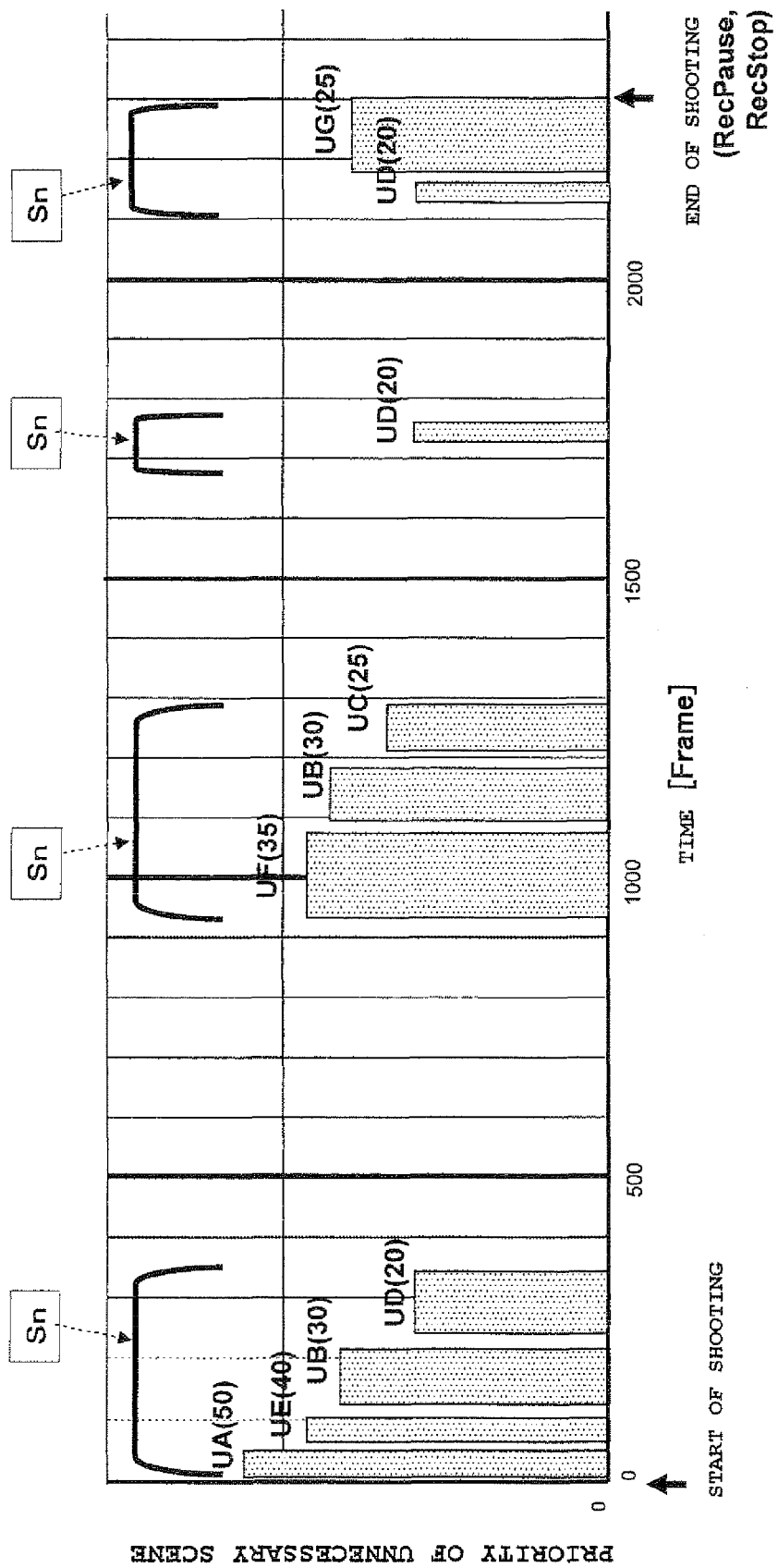
FIG. 5 is a diagram for explaining generation of unnecessary scene information.

Exemplary unnecessary scene detection by the unnecessary scene detection means 411 will now be described with reference to FIGS. 5 and 6. The graph of FIG. 5 illustrates temporal changes of the unnecessary scene detection. In the graph of FIG. 5, the vertical axis denotes the priority level of the unnecessary scene metadata, and the horizontal axis denotes the passage of time (frame).

The unnecessary scene detection means 411 detects metadata (UA, UB, UC, UD, UE, UF, UG) for an unnecessary scene Sn shown in FIG. 5. Note that:

UA represents the state where the camera cap is closed;

UB represents the state where the camera is heavily jiggling, hence extremely unstable;

UC represents the state of out-of-focus due to mis-focusing;

UD represents the state of excessively quick panning/tilting/zooming;

UE represents the state of backlight;

UF represents the state of acoustic howling; and

UG represents the state of shooting the ground.

As for images of the above states to be represented by metadata, those with common sense and feelings would almost universally recognize such images as unnecessary scenes. This is conceivably because value judgment about unacceptable matters generally greatly relies on human physiological perception and recognition mechanisms, and such value judgment is almost universal around the world.

Concretely, the metadata UA, US, UC, UP, UP, UF, and UT are weighted with priority points, such as, UA: 50 points; US: 30 points; UT: 25 points; UP: 20 points; UP: 40 points; UF: 35 points; UT: 25 points.

In FIG. 5, an algorithm used for selecting the unnecessary scene Sn not only handles a single scene but also collectively handles a plurality of unnecessary scenes as a continuous unnecessary scene Sn when such scenes occur at intervals of 60 video frames or less. Specifically, (single unnecessary scene section) (plural unnecessary scene sections at intervals of 60 frames or less) is defined as a "definitional equation for unnecessary scene sections.

Note that the reason why a plurality of unnecessary scenes at intervals of 60 frames or less are handled as a single unnecessary scene is because joining discontinuous video images within 60 frames results in hurried and rushed video. As for scene information concerning the unnecessary scene Sn, the type of metadata with the highest priority in the unnecessary scene, the time of the unnecessary scene, and the period of the unnecessary scene (the length of the unnecessary scene) are all used, as detailed descriptions of the scene information, for playlist marker information (which can be used for marker skip), auxiliary data associated with an algorithm for selecting the marker information, and so on.

Note that the number of unnecessary scenes can be preset in accordance with the length of content. For example, it is possible to set the number of unnecessary scenes, such as five scenes or less per minute, and up to maximum of 100 scenes. In addition, it is possible to specify the type of the unnecessary scene, and a reduction rate per content. Furthermore, in the case of shooting stable video using a tripod stand or suchlike, the shooting can be carried out with an unnecessary scene detecting function being manually turned OFF.

Figure 6:
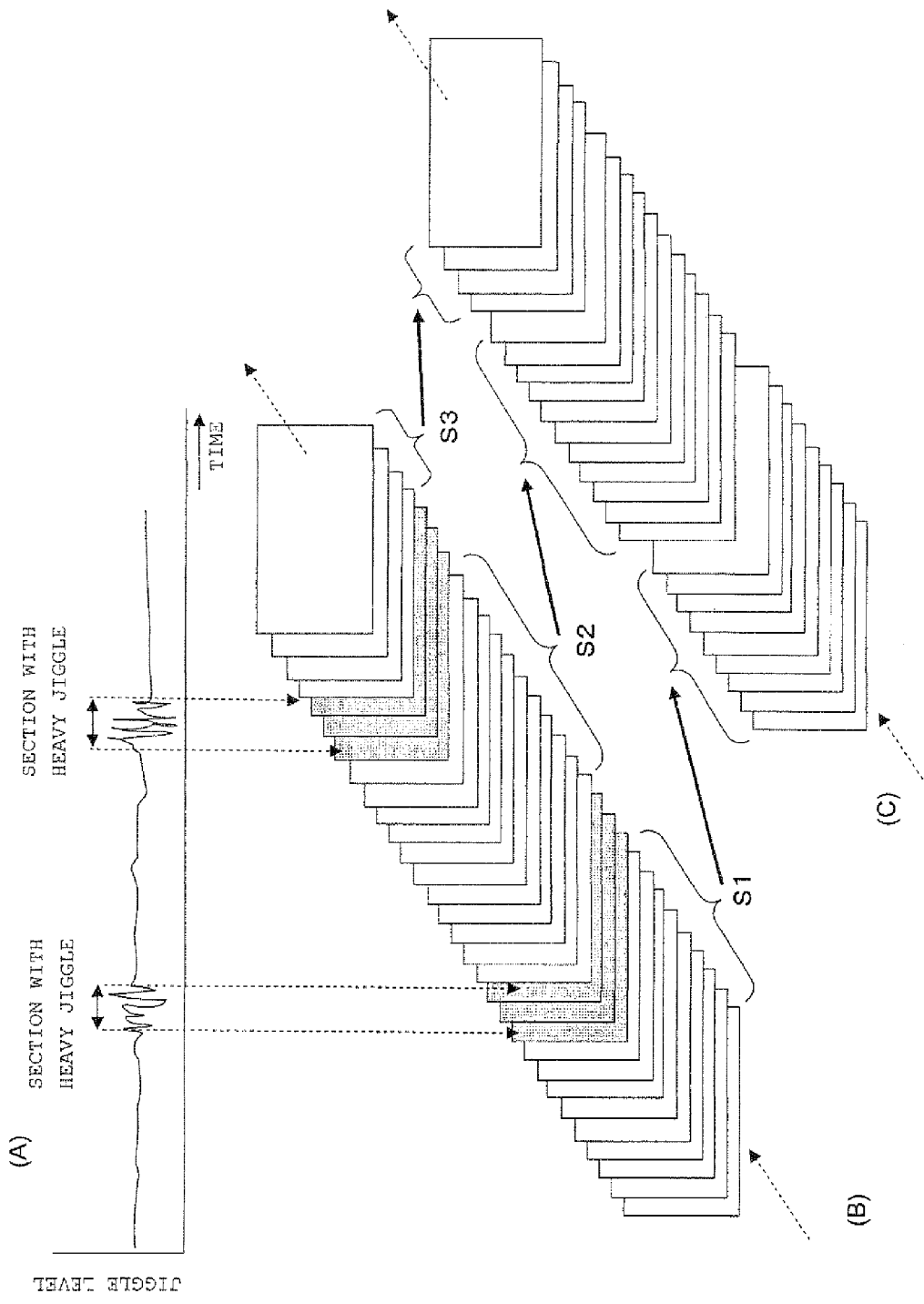
FIG. 6 is a diagram for explaining a procedure in which two sections with heavy jiggle are deleted from shot content, and three sections free from jiggle are combined to realize a single video sequence free from jiggle.

FIG. 6 illustrates an example of deleting unnecessary scenes. In FIG. 6, (A) shows temporal changes in jiggle level of shot content, and (B) shows a video sequence of the shot content (in the figure, rectangular blocks represent frames). Furthermore, (C) shows a video sequence consisting of a combination of three sections (S1, S2, and S3) free from jiggle.

Two sections (scenes) with heavy jiggle are deleted from the shot content shown in FIG. 6(B), and three sections (scenes S1 to S3) free from jiggle are combined to realize a single video sequence free from jiggle as shown in FIG. 6(C). Note that any section becoming unnecessary due to a reason other than jiggle can be deleted in a similar manner.

Figure 7:
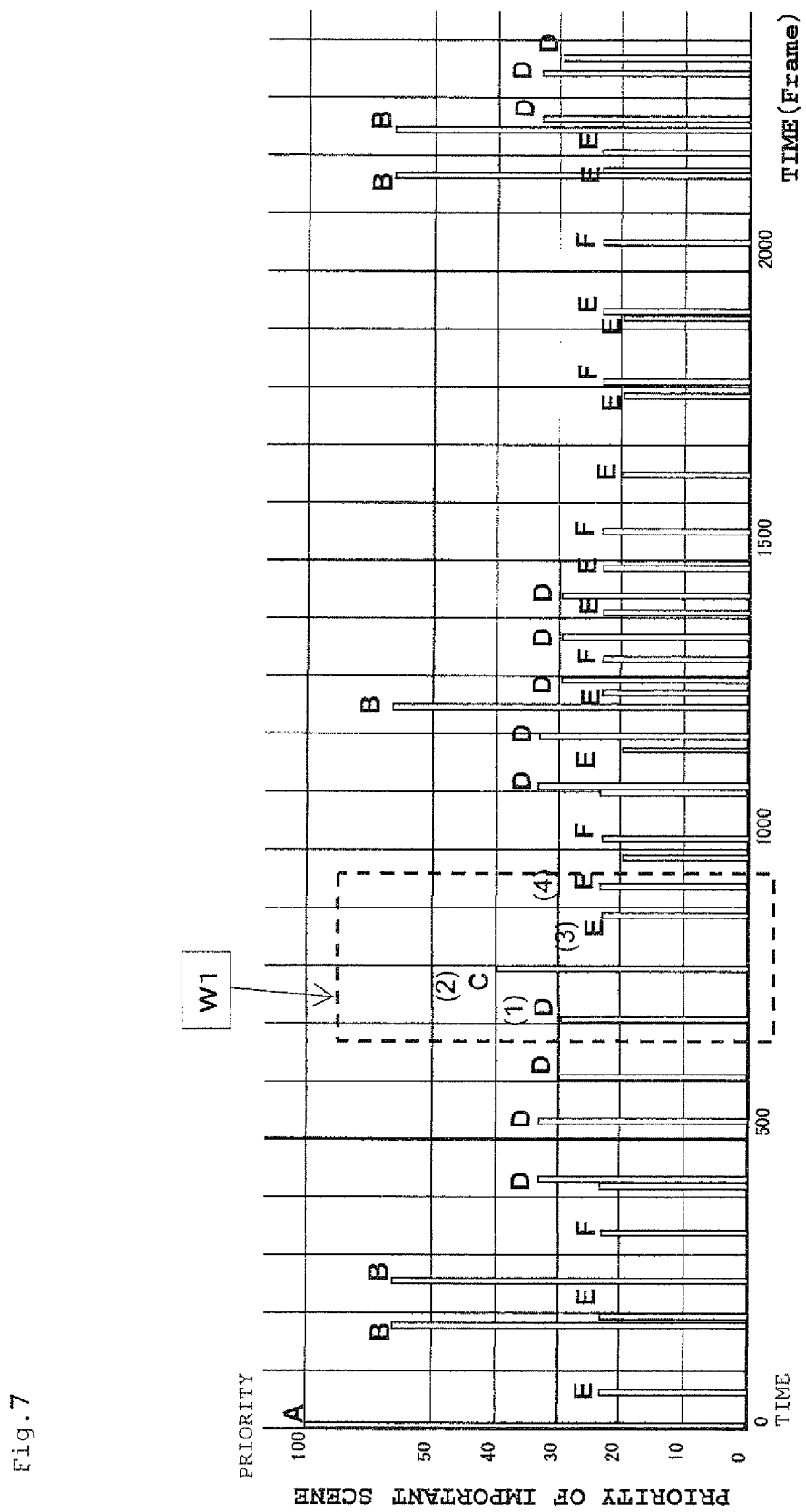
FIG. 7 is a diagram for explaining generation of important scene information.

Next, an example of detecting important scenes by the important scene detection means 412 will be described with reference to FIGS. 7 and 8. The graph of FIG. 7 illustrates temporal changes of the important scene detection. In the graph of FIG. 7, the vertical axis denotes the priority level of the important scene metadata, and the horizontal axis denotes the passage of time (frame). The important scene detection means 412 detects the important scene metadata (A, B, C, C, F, and F) shown in FIG. 7 as described below.

As for metadata (A), possible to extract a fixed portion of one to three seconds at the beginning (CLIP-IN) or the end (CLIP-OUT) of a clip as an important portion. The priority (point) of metadata (A) is set to, for example, 100 points.

As for metadata (B), it is possible to extract sound detection metadata 107 (a metadata portion for a detected input from a main or sub microphone, such as voice, sound of a clapperboard, gunshot, or cheers) as an important portion. The priority (point) of metadata (B) is set to, for example, 70 points.

As for metadata (C), it is possible to detect a fixed (static) scene after panning or tilting of the camera based on an output from a gyro sensor. The priority (point) of metadata (C) for the fixed scene (a portion in which the camera operator has shot a fixed video image with interest; a portion of interest) is set to, for example, 40 points.

As for metadata (B), it is possible to detect a zoomed-in or zoomed-out portion by monitoring temporal changes in the zoom value of the camera. More specifically, it is possible to extract a fixed portion of one to three seconds before or after zooming in or zooming out as an important portion. The priority (point) of metadata (B) is set to, example, 30 points.

As for metadata (B), it is possible to detect panning or tilting of the camera based on an output from the gyro sensor. The priority (point) of metadata (B) is set to, for example, 25 points.

As for metadata (F), it is possible to divide a shot video image obtained from an image sensor into a plurality of blocks, and detect information that indicates, for each block, whether hue and chromaticity are within their predetermined ranges. For example, it is possible to detect a human face based on the size and shape of a detected block, and the degree of skin tone. Moreover, it is possible to detect a human face with higher accuracy based on the shape of a detected block and the degree of skin tone in a fixed video image after panning, tilting, or zooming. The priority (point) of metadata (H) is set to, for example, 25 points.

The point to be noticed is that recognition of the important scene under the above-described conditions may slightly vary between those without skill in shooting and those skilled in camerawork for shooting, even if both of them have common sense and feelings. That is, those skilled in shooting carry out shooting, considering camerawork according to video shooting techniques, whereas those without skill do not have such knowledge, so that it is often the case that they shoot a subject without taking camerawork into consideration. However, it is usually the case that even those without skill gradually learn commonly acknowledged camerawork through advice from others and their own findings as they experience shooting.

Figure 8:
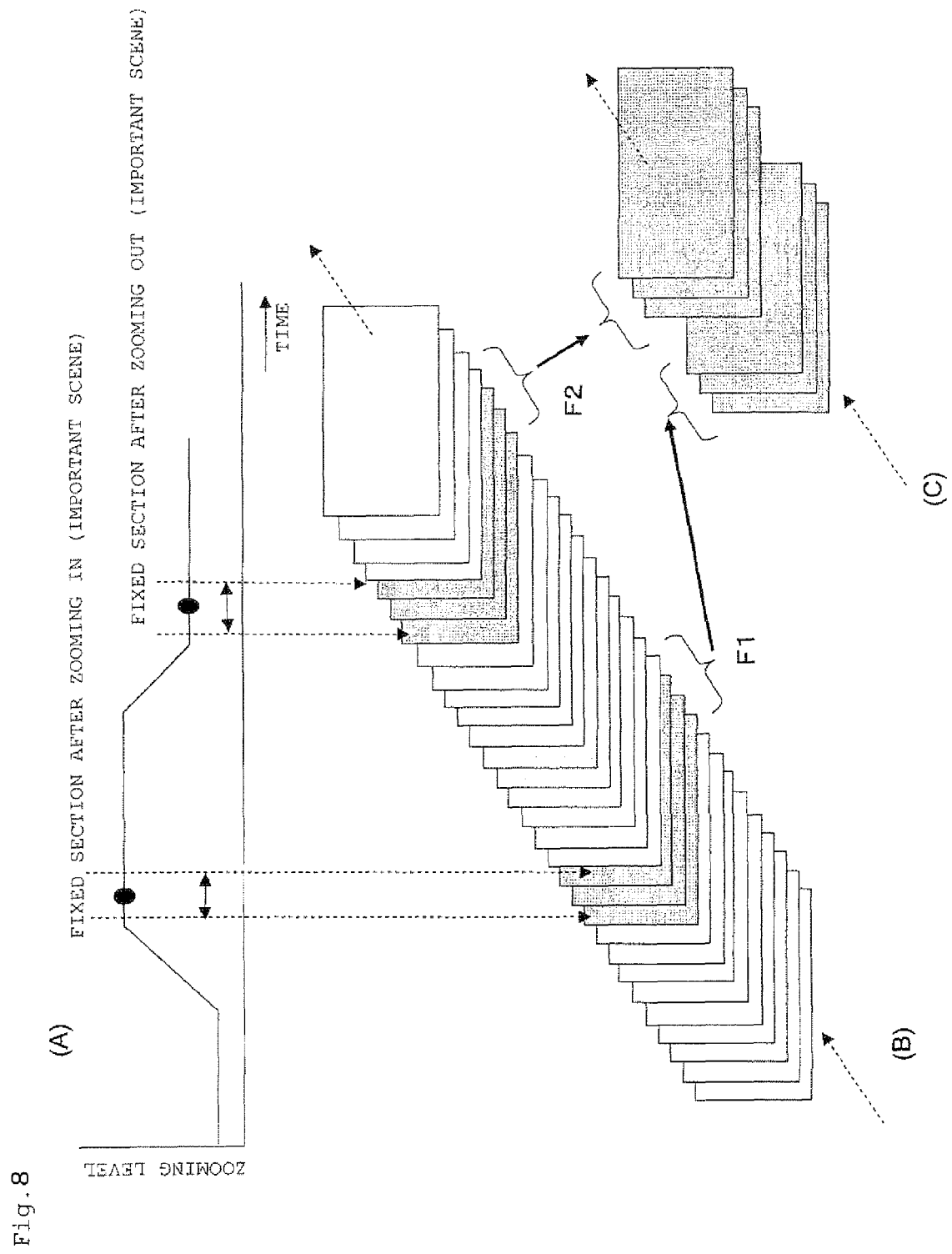
FIG. 8 is a diagram for explaining a procedure in which two fixed sections after zooming in and out, respectively, are extracted from shot content to realize a single digest.

FIG. 8 illustrates an example of extracting important scenes and generating a digest. In FIG. 8, (A) shows temporal changes in zooming level of shot content, and (B) shows a video sequence of the shot content (in the figure, rectangular blocks represent frames). Furthermore, (C) shows a video sequence obtained by extracting fixed sections (scene) F1 and F2 after zooming in and out, respectively.

Two fixed sections (scenes) after zooming in and out, respectively, are extracted from the shot content shown in FIG. 8(B) to realize a single digest as shown in FIG. 8(C). Note that important scene extraction and digest generation based on a factor other than zooming in and out can be carried out in a similar manner.

Referring back to FIG. 7, metadata A, B, C, D, E, and F are assigned their respective weighted priorities (points). In FIG. 7, the important scenes are important scenes or video frames represented by any of the metadata A, B, C, D, E, and F, and typified by metadata with the highest priority level among a plurality of important scenes present within a window of N frames, where N is an integer.

For example, in the case where window W1 of 300 frames in width is used, (the priority level of a scene with the highest priority level within the window of a 300 frame section)+(a value obtained by weighting the priority level of another preferential scene with a prescribed coefficient) defined as a "priority point calculation equation" based on a plurality of important scenes present within the window, thereby calculating "the priority level of a plurality of important scenes". The weight for the priority level of any preferential scene other than the most preferential scene is set to, for example, 0.2.

In the example shown in FIG. 7, the important scene detection window W1 contains D (30 points), C (40 points), E (25 points), and E (25 points). Therefore, the sum of priority levels is:

$$0.2 \times 30 + 40 + 0.2 \times 25 + 0.2 \times 25 = 6 + 40 + 5 + 5 = 56.$$

Note that as for the scene information concerning the important scene, the type of metadata (A, B, C, D, E, and F) with the highest priority in the important scene, the time of the important scene, and the period of the important scene (the length of the important scene) are all used, as detailed descriptions of the scene information, for playlist marker information (which can be used for marker skip), auxiliary data associated with the marker information, and so on. Here, the number of important scenes can be preset in accordance with the length of content. In addition, it is possible to preset a reduction rate per content with important scenes.

For example, in the example shown in FIG. 7, the metadata with the highest priority within the window W1 of a prescribed length is set as the second metadata for use in digest generation. In this case, metadata C of "interest" present around the eight-hundredth frame and representing a fixed state is selected. In this case, an event type, an event priority, as well as a start time, an end time, and a representative time of the event are assigned to the metadata as attributes in accordance with a predetermined rule. As a result, with reference to the second metadata and its attributes, i.e., the start time, the end time, and the representative time of the event, a shot scene of, for example, five seconds from zooming in (three seconds) to fixing (two seconds) can be represented by a piece of metadata.

Therefore, digest video can be generated by specifying the order of priority of the metadata or the event type of the metadata.

In addition, by specifying the order of priority of the metadata or the event type of the metadata (e.g., a zoomed-in portion) and referencing the position of the metadata, it becomes possible to perform skip playback (skip playback based on metadata) for skipping to a portion of interest (e.g., a zoomed-in portion) within the shot content.

Note that in FIG. 7, it is also possible to provide an additional mode to be set for selecting the second metadata only when the total value of priority metadata within a window of a given period exceeds a preset value (e.g., 250).

Also, as for sorting of high-priority scenes, more stable scene sorting is made possible by sorting the high-priority scenes out from content with any low-priority scenes having been previously excluded therefrom. For example, in the case of scenes that are considered to be valid as high-priority scenes in a zoomed-in, fixed portion, if they are out of focus, such low-priority scenes can be preferentially excluded.

Similarly, in some cases, scenes that are considered to be valid as high-priority scenes in a zoomed-in, fixed portion have screen images darkened by backlight. Such low-priority scenes can be preferentially excluded. Also, in the case of scenes of a footrace in an athletic meet that are considered to be valid as high-priority scenes because a starter's gun shot is detectable, if they are unwatchable because of excessively quick zooming-in or panning, such low-priority scenes can be preferentially excluded.

As described above, a playlist is generated as the first step, so as to consist of stably shot scenes excepting any low-priority scenes. Next, as the second step, any high-priority scenes are sorted out from among the stable scenes. For example, the high-priority scenes are added to the playlist created by the first step to sort important scenes out from the content with any invalid portions having been excluded therefrom. With the above steps, it becomes possible to sort out visually more stable important scenes free from jiggle, out-of-focus blurring, etc.

Note that metadata (UA, UB, UC, UD, UE, UF, and UG) for unnecessary scenes may be processed with a negative sign because of their negative meaning of "unnecessary". However, in this case also, the unnecessary scene calculation algorithm (a process for bundling a plurality of unnecessary scenes as a single unnecessary scene) and the important scene calculation algorithm (a process for determining a representative scene from among a plurality of important scenes, and calculating the priority level of the representative scene) are different processes, which cannot be realized by the same algorithm.

Also, any scene with a value between the high-priority scene (important scene) and the low-priority scene (unnecessary scene) can be handled as an ordinary scene (common scene).

FIG. 4 is referenced again. The real-time data selection/mapping means 413 maps the aforementioned real-time metadata to SEI, so that thereafter, based on this data, scene information for unnecessary scenes and important scenes can be calculated again with even other playback equipment such as a personal computer. This is effective when any algorithm for recalculating scene information for unnecessary scenes and important scenes is updated.

Figure 9:
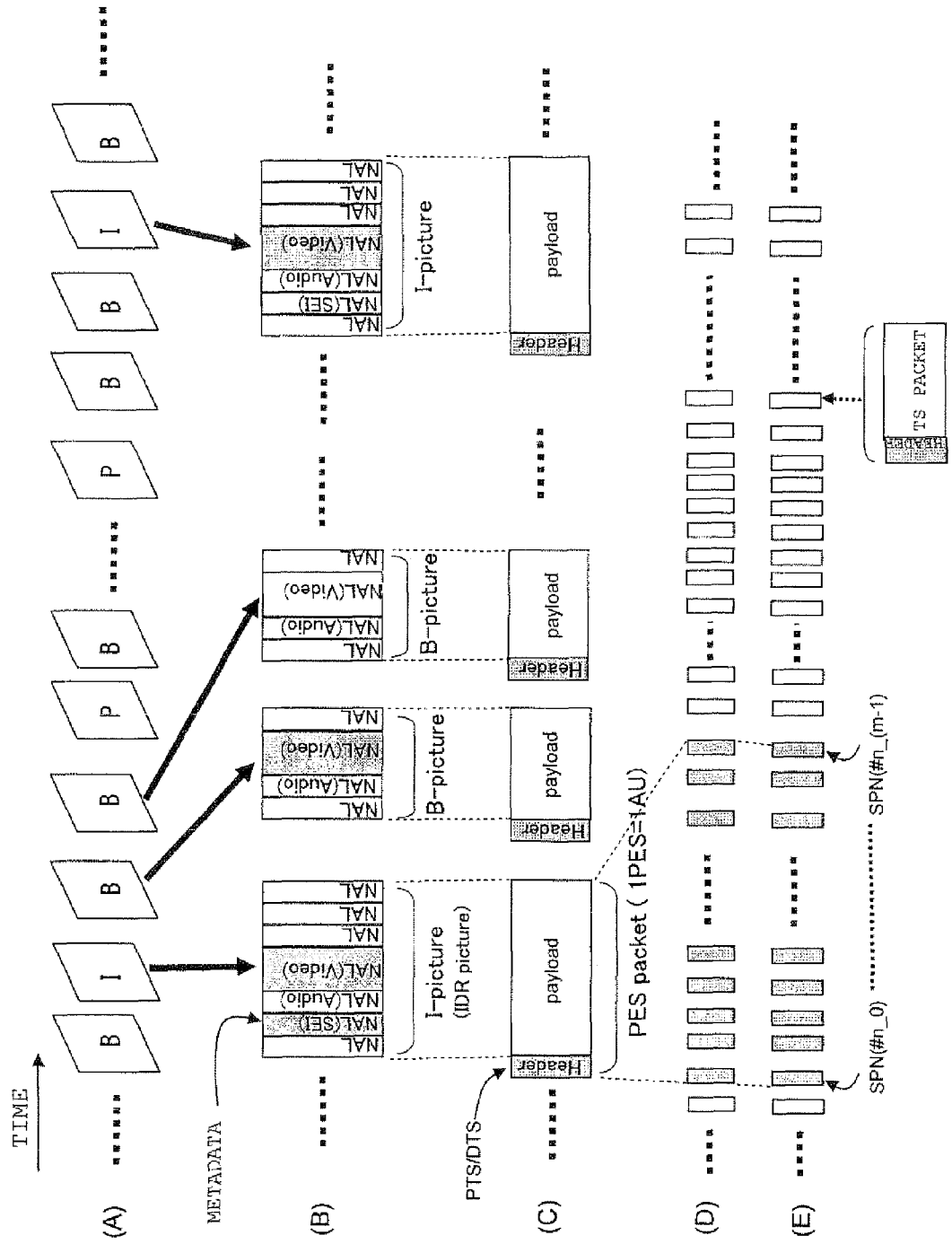
FIG. 9 is a diagram for explaining an H.264 picture structure and a conversion method to MPEG-TS.

Before describing processing of data outputted from the VCL-NAL unit buffer 402 and the non-VCL-NAL unit buffer 407, the H.264/AVC stream will be described with reference to FIG. 9. FIG. 9(A) illustrates a GOP structure of the H.264/AVC stream. FIG. 9(B) illustrates structures of pictures included in the GOP. Each picture is composed of VCL and non-VCL NAL units. NAL(video) is a NAL unit for video, NAL(Audio) is a NAL unit for audio, and NAL (SEI) is a NAL unit for SEI. As for NAL(SEI), the real-time metadata can be inserted.

Note that experiments resulted in the finding that information concerning, for example, panning and tilting of the imaging apparatus, as well as zooming and focus of the lens is not always required to be inserted into all pictures in the GOP structure, and if such information is removed every two frames, it is possible to recover panning, tilting, zooming, and focusing camerawork at an appropriate speed for typical viewing, so long as time codes can be recovered.

FIG. 9(C) illustrates PES packet structures in which a PES packet header is assigned to the picture data shown in FIG. 9(B). Note that the PES packet header can include PTS/DTS for MPEG as a header option. In accordance with the 0.264 standard, the PES packet is handled as a single AU (Access Unit). In the present example, the PES packet is divided every 188 bytes, thereby generating MPEG-TS packets, as shown in FIG. 9(D). FIG. 9(E) illustrates ATS packets each being configured by adding a 4-byte header including a time code to the MPEG-TS packet.

Referring back to FIG. 4, processing of data outputted from the VCL-NAL unit buffer 402 and the non-VCL-NAL unit buffer 407 will be described. MPEG-PES packets (see FIG. 9(C)) are generated based on VCL-NAL unit format data outputted from the VCL-NAL unit buffer 402 and non-VCL-NAL unit format data outputted from the non-VCL-NAL unit buffer 407, and then MPEG-TS (see FIG. 9(D)) packets of 188 bytes in length are generated. Then, a 4-byte header including a time stamp is added to each of the MPEG-TS packets, thereby generating ATS packets of 192 bytes (see FIG. 9(E)).

The time stamp indicates, for example, the time when the MPEG-TS packet reached the process block for generating the ATS packet. In general, the time stamp clock is 27 MHz, and in some cases, four bytes are all used for a time stamp, or 30 bits out of four bytes are used for a time stamp, so that the remaining two bits are used for a content protection flag.

Also, in each GOP (Group of Picture) included in a stream, the PTS (Presentation Time Stamp) of the first picture and the serial number of the first ATS in the first picture are paired and outputted as an EP-MAP. Note that PTS and DTS (Decode Time Stamp) are included in the header of the PES packet, and therefore can be readily extracted.

Also, the serial number of the first ATS in the first picture of each GOP is determined by sequentially counting the number of ATSs from the beginning of the stream with the serial number of the first ATS in the stream being 1. The EP-MAP defined as a pair of the PTS and the ATS serial number of the first picture in the GOP is used for playback based on a playlist and stream editing.

The H.264/AVC scheme is described in detail, for example, in "H.264/AVC Kyokasho [Instructional Textbook on H.264/AVC]", edited by Sakae Okubo, published by Impress, Inc. Also, the MPEG-TS signal is defined by IEC 61883-4.

An example of the references for TS formats, such as PAT and PMT of the MPEG-TS standards, is "Gaza & Onsei Asshuku Gijyutsu No Subete (Internet/Digital Television, Mobile Tsuushin Jidai No Hisshuu Gijyutsu) ["All About Image and Audio Compression Techniques (Essential Techniques for the Era of Internet/Digital Television, Mobile Communication)"], TECH I Vol. 4, edited by Hiroshi Fujiwara, CQ Publishing Co., Ltd., Chapter 6, "Gazo Ya Onsei No Tajyuukasuru. MPEG system. [MPEG System for Image and Audio Multiplexing]", which provides explication of the TS formats.

Also, hierarchical structures of PSI and SI, exemplary procedures, exemplary tuning processes are described in "Tuning Technology for Digital Broadcast Receiver", Miyake et al., SANYO Technical Review, VOL. 36, June, 2004, the No. 74 edition, pp. 31 to 44.

Next, an exemplary H.264/AVC file configuration will be described with reference to FIG. 10. A directory structure Sd is shown in the left rectangular block, and a file structure Sf is shown in the right rectangular block. These structures are constructed on an information recording medium, such as an SD card, a DVD-R, a DVD-RAM, or a BD-RE.

In the directory structure Sd, a reference file (ref.file), as well as "PlayList", "CLIP", and, "STREAM" directories, are present under root. A "*.pls" file, which is a playlist (file), is present under the "PlayList" directory. In addition, "*.clp" files, which are clip files, are present under the "CLIP" directory. "*.ats" files, which are stream files each composed of an ATS (192 bytes), are present under the "STREAM" directory.

In the file structure if, the reference file (ref.file) manages content title information (Title #n, where n is a natural number), as well as a plurality of pieces of chapter information (Chapter#1, C#2, C#3, and C#4). The playlist (PlayList#1) manages a plurality of pieces of playback part information (PlayItem#1, P#2, and P#3). In addition, the clip files (Clip#1, Clip#2, and Clip#3) have an EP map (EP Map). The EP map is a map table for cross-reference between PTSs and ATS serial numbers of ATS packets contained in the stream files, and the EP map is used for interconversion between time codes and data positions, and therefore indispensable for playing back playlists, as well as editing stream files.

As described above, a title is correlated with a playlist file, the playlist file is correlated with a clip file, and the clip file is correlated with an ATS packet in a stream file.

The above-described real-time metadata and non-real-time metadata are mapped to SEI, and thereafter converted into ATS stream files. In addition, metadata generated by an arithmetic operation based on the real-time or non-real-time metadata is used as clip scene information to be mapped to part information or an auxiliary area of the playlist. Specifically, a list with a priority is mapped as playlist file auxiliary data to be referenced at the time of playing back shot content. Thus, an important feature is provided, which makes it possible to refer to clip scene information metadata by simply looking at data in the playlist file.

Thus, it is possible for content playback equipment to instantaneously access (skip) a start or representative point of an event in shot content, such as an unnecessary scene or an important scene, with reference to information added to the playlist. In addition, by referring to a list of metadata, which is playlist file auxiliary data to be referenced at the time of playback, it becomes possible to sequentially play back a specified event section (an event section generated with reference to an event from the start to the end point).

In the case of generating a digest consisting of important scenes, it is also possible to generate a new playlist file with reference to scene information metadata, such as scene priority, scene type, digest time length, or ratio of reduction to digest, as specified by digest scheme specification means (the user input system 210 of FIG. 2), or with reference to a scene list, which is playlist auxiliary data.

Furthermore, by referring to the playlist, it becomes possible to play back sections specified as important scenes in a normal manner, and other scenes at high speed. Moreover, by referring to the playlist, it becomes possible to play back sections specified as unnecessary scenes at high speed, and other scenes in a normal manner. Also, by referring to the playlist, it becomes possible to play back sections specified as unnecessary scenes, such that detected representative scenes or previously shot and registered still images are each displayed for three seconds, and other scenes at normal speed.

As for shot content, in particular children's music recital, in consideration of the desire to listen to piano performance, choral performance, etc., without interruption, but not to see unnecessary video that is jiggling or out-of-focus, it is possible to play back audio without interruption, while playing back substitution video, which contains representative scenes or previously shot and registered video images (blue skies, buildings, flowers, faces of children, etc.).

By referring to a playlist, it becomes possible to generate video to be displayed with horizontal and vertical jiggle in shot video that are caused by camerawork being removed, so that such video is played back for sections specified as unnecessary scenes, and other scenes are played back at normal speed.

By referring to a playlist, a new playlist, which consists of scenes at a predetermined priority level or higher, or scenes taken by specific camerawork, may be generated, and registered after a title is given thereto.

By referring to a playlist, it becomes possible to generate and play back background music in accordance with the type of each scene, such that the melody, tone and tempo of the background music are changed immediately before switching of scenes, thereby achieving more artistically- and culturally-refined content playback.

Next, an example of editing shot content will be described with reference to FIG. 11. In the figure, scene priority levels and points are shown within rectangular blocks representing scenes #1 to #5. Also, the size of data is shown in the lower row for each scene, and the sum total of data size is shown in a block at the right end.

There are four modes for handling files as follows:
mode A: original shot content;
mode B: content consisting of unnecessary scenes (scenes with a priority level of less than 30 points);
mode C: content free from any unnecessary scenes (scenes with a priority level of more than 30 points); and
mode D: content consisting of important scenes (scenes with a priority level of 50 points or more).

There are three editing steps as shown below. Concretely,
step 1) content only consisting of unnecessary scenes is retrieved and confirmed from an original shot content file recorded in a recording medium, and then the unnecessary scenes are deleted if it is appropriate;
step 2) content free from unnecessary scenes is generated; and
step 3) content consisting of important scenes as indicated by metadata is further generated from the content free from unnecessary scenes.

Here, steps 1, 2, and 3 can be realized by simply operating playlist files without changing any ats files.

Also, in the case where content consisting of unnecessary scenes is played back in mode B, it is possible to insert tickers into video, thereby allowing the user to know on what condition the scenes are unnecessary. Furthermore, as for mode C, when each characteristic scene is being played back, the description of the characteristic scene can be superimposed as a ticker on the video being played back.

Moreover, content free from unnecessary scenes in mode C and content consisting of important scenes in mode D can be combined to generate a complete package file.

Figure 11:
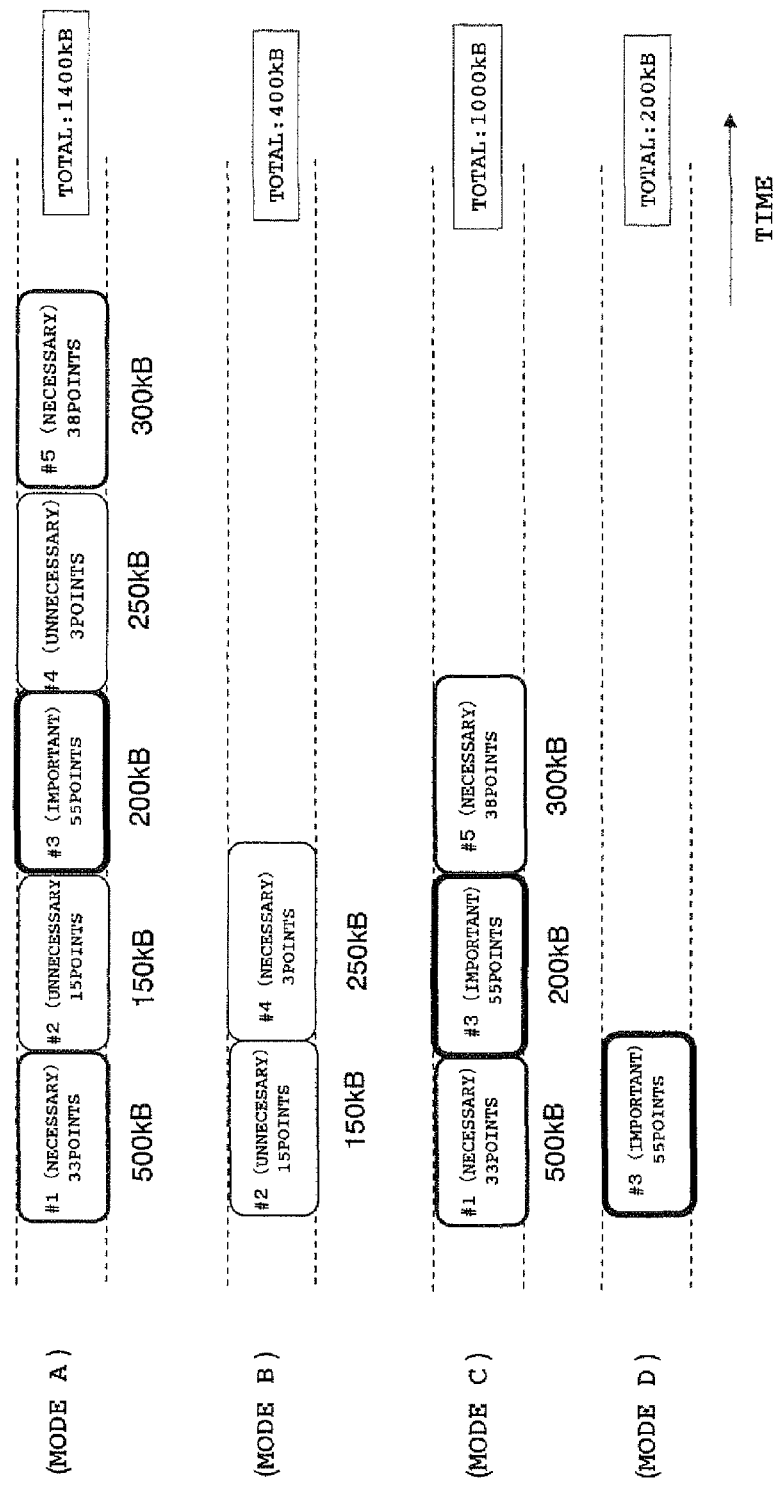
FIG. 11 is a diagram for explaining a concept for content editing.
Figure 12:
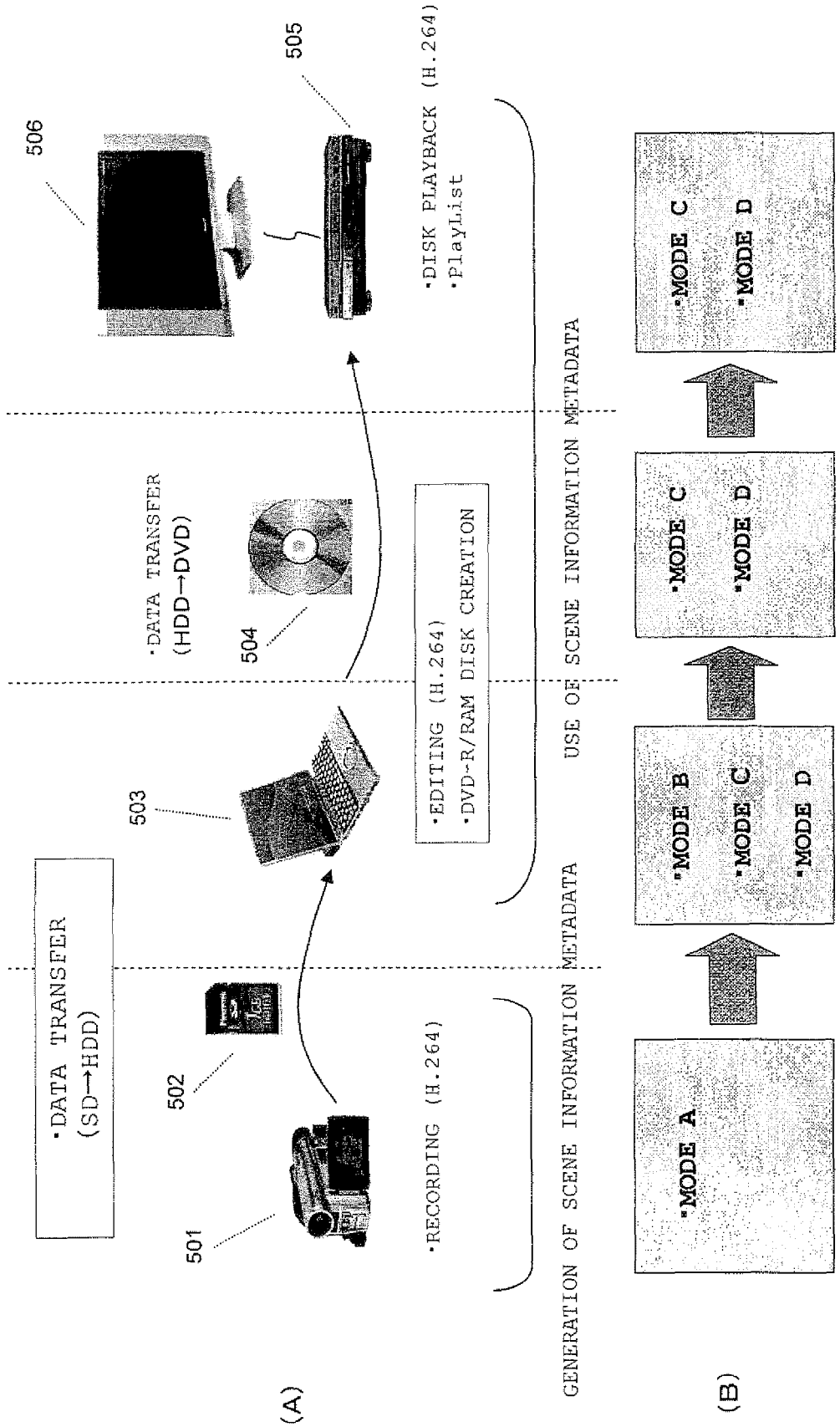
FIG. 12 is exemplary content editing among equipment.

FIG. 12 illustrates an exemplary system configuration for editing shot content as described with reference to FIG. 11. The system in FIG. 12 consists of a camcorder, a personal computer, a DVD recorder and a TV. In FIG. 12, A) shows the equipment included in the system, and (B) shows modes handled in the equipment.

A method for editing shot content based on metadata will be briefly described with reference to FIG. 12. In FIG. 12(A), video data, audio data, and metadata are recorded to an SD memory card 502, which is a recording medium for the camcorder 501. The SD memory card 502 is inserted into the personal computer 503, and recorded data is transferred.

At this time, if metadata 107, such as important scenes as described above, is already recorded in the SD memory card 502, the data is transferred to a hard disk of the personal computer 503 for playlist confirmation. If there is any playlist, the personal computer 503 can automatically perform assembly editing or non-linear editing at the time, thereby generating a complete package file. Also, the personal computer 503 almost automatically records and saves the edit file to the medium 504, such as a DVD-R or a DVD-RAM. Accordingly, by playing back the medium 504 with the DVD player 505, the edit file can be viewed on the TV 506.

As shown in FIG. 12(B), the camcorder 501 employs mode A of FIG. 11, the personal computer 503 employs modes B, C, and D, and the DVD recorder 505 and the TV 506 employ modes C and D.

As described above, the content shooting apparatus of the present embodiment makes it possible to readily perform deletion of unnecessary portions from shot content obtained by video shooting, as well as digest generation. As a result, it becomes possible to readily generate content having any unnecessary portions removed therefrom, and a digest consisting of scenes expected to be important, over a period from the start to the end of clip recording during shooting of moving images.

Second Embodiment

Figure 13:
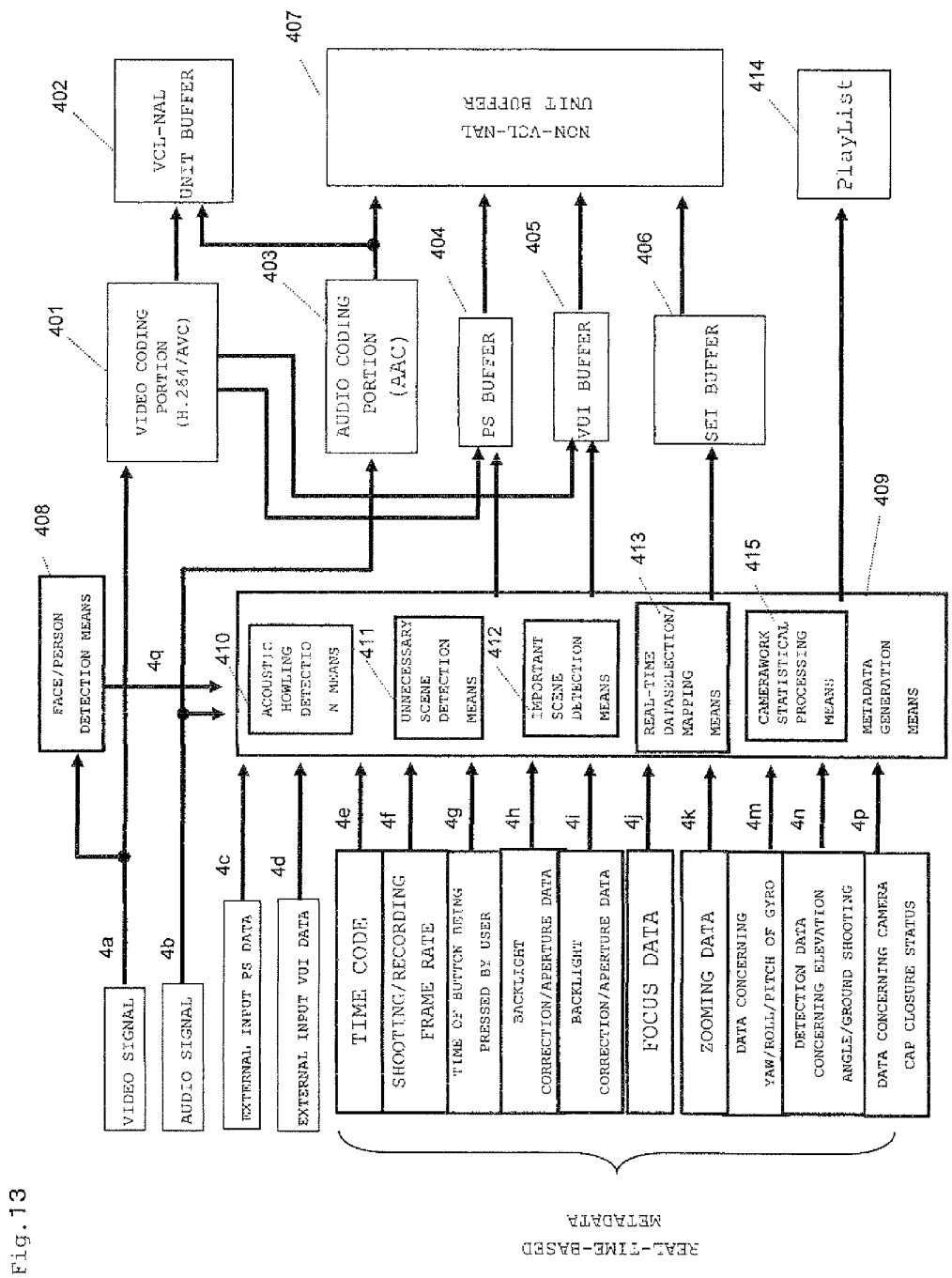
FIG. 13 is a diagram for explaining blocks for generating metadata and compressing AV signals within a content shooting apparatus according to a second embodiment of the present invention.

FIG. 13 illustrates in detail blocks for generating metadata and compressing AV signals within a content shooting apparatus according to a second embodiment of the present invention. The above-described content editing apparatus according to the first embodiment makes it possible to readily perform deletion of unnecessary portions and extraction of important scenes from shot content, thereby generating a digest as preferred by the user. On the other hand, the content shooting apparatus according to the present embodiment assists the shooter in shooting in a well-balanced manner, such that a digest is generated so as to meet the user's desire.

The content shooting apparatus according to the present embodiment is configured basically in the same manner as the content shooting apparatus according to the first embodiment. However, the camcorder 101 is configured in a slightly different manner from that in the first embodiment in accordance with the aforementioned difference in function. Concretely, the configuration shown in FIG. 13 includes camerawork statistical processing means 415 in addition to the configuration shown in FIG. 4, and correspondingly, the algorithm of the metadata generation means 409 differs from that of FIG. 13.

As described above, the content shooting apparatus of the present embodiment is characterized by assisting the shooter in shooting in a well-balanced manner over a period from the start to the end of clip recording during shooting of moving images. Hereinafter, the configuration and operation of the content shooting apparatus according to the present embodiment will be described with reference to FIGS. 13 to 16, mainly focusing on the characteristic point. Accordingly, in principle, the same configuration and operation as those described in the first embodiment will be omitted in the following description.

The camerawork statistical means 415 monitors or records user camerawork, such as panning, zooming, and fixing. If shooting camerawork during a predetermined period of time in the past, for example, the last five minutes, is only zooming-in, the shooter is reminded of zooming out to shoot global video images by an indication on a camera viewfinder.

That is, camerawork statistical means 415 assists the shooter in shooting in a well-balanced manner over a period from the start to the end of clip recording during shooting of moving images. As a result, when generating a digest of shot content, it is possible to obtain more well-balanced shot content, such that the digest is not constituted by only zoomed-in, panned, or fixed scenes.

Figure 14:
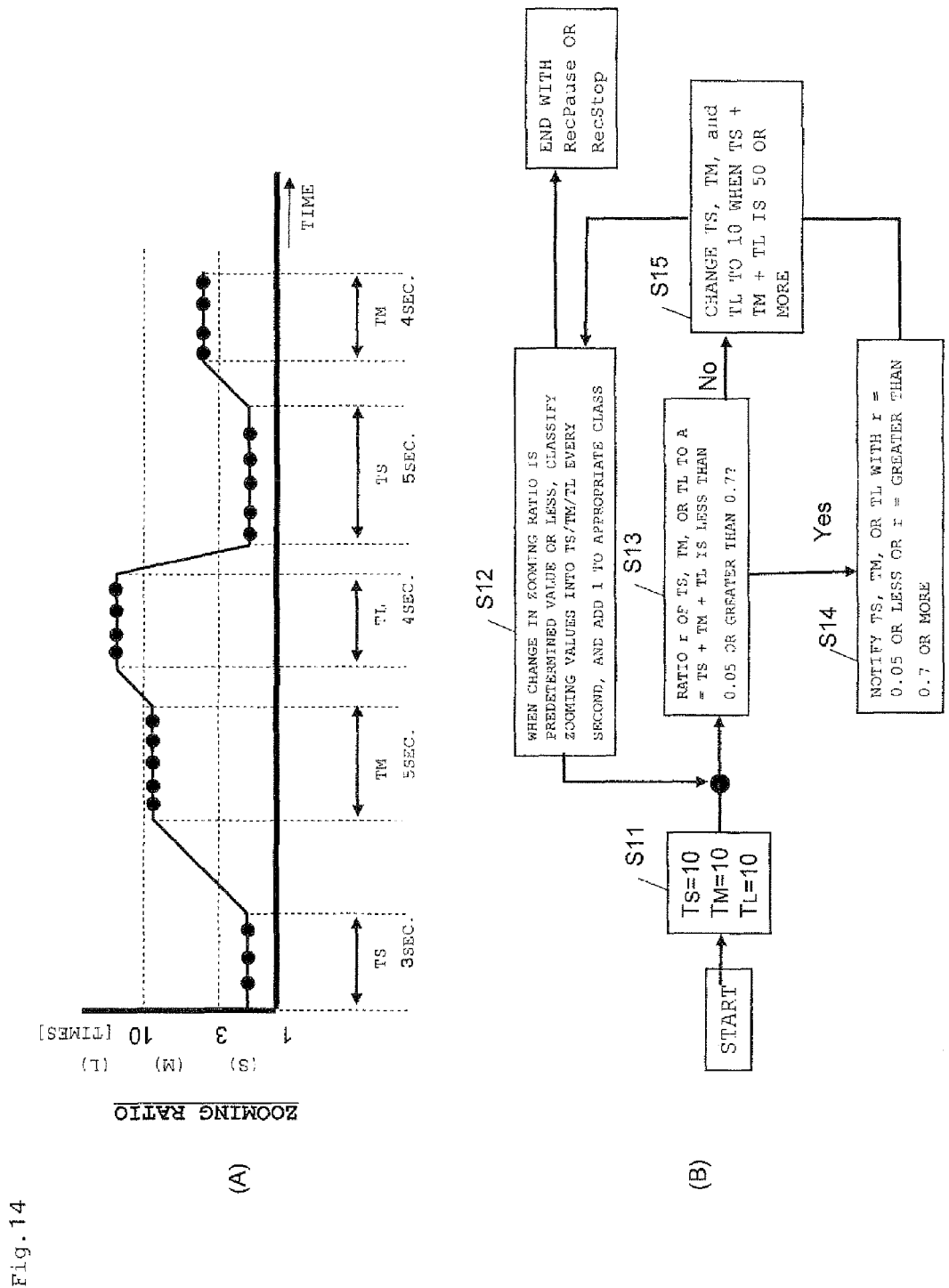
FIG. 14 is a diagram for explaining the function of camerawork statistical means shown in FIG. 13.
Figure 15:
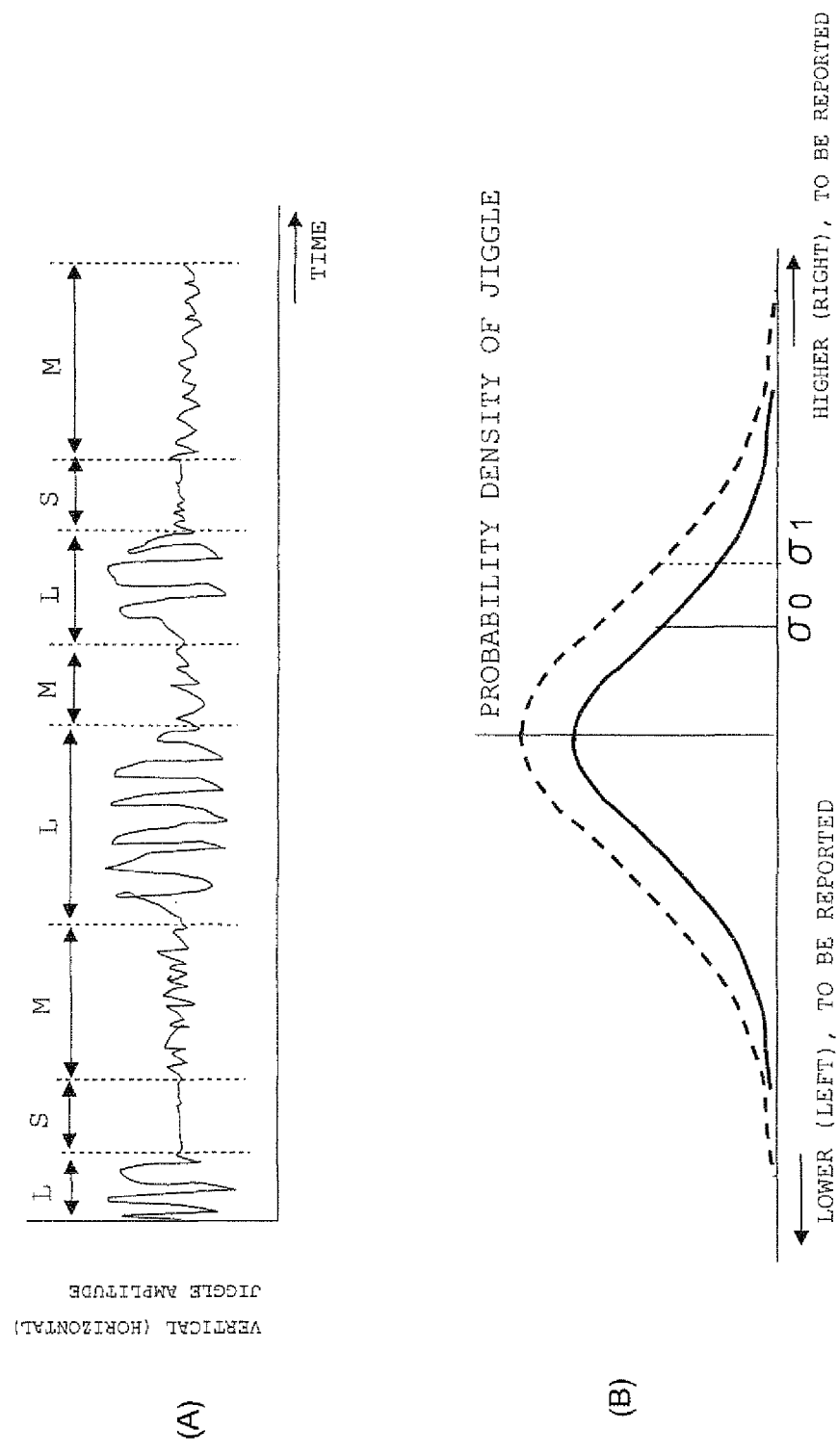
FIG. 15 is a diagram for explaining the function of the camerawork statistical means shown in FIG. 13.

Hereinafter, the function of the camerawork statistical means 414 will be concretely described with reference to FIGS. 14 to 16. First, a case where the shooter is notified of a biased zooming operation will be described with reference to FIG. 14. FIG. 14(A) is a graph illustrating temporal changes in zooming ratio, in which the horizontal axis denotes time, and the vertical axis denotes zooming ratio. The graph of FIG. 14(A) is divided into three ranges in accordance with the zooming ratio denoted by the vertical axis. Specifically, a zooming ratio of up to three times is categorized into range (S), a zooming ratio from three to ten times is categorized into range (H), and a zooming ratio of ten times or more is categorized into range (L).

In the example of FIG. 14(A), the zooming ratio is first at about 2, and experiences a transition of zooming in to slightly less than 10, a further transition of zooming in to about 15, and a transition of zooming back out to about 2 before a transition of zooming in to about 4.

Here, changes in zooming level are measured every second, and if the difference by change in zooming ratio per second is within 5%, the zooming ratio is considered to be substantially fixed. Then, a mark (a filled circle in the figure) is assigned every second, representing the state of being fixed, and the presence ratio among ranges (L), (M), and (S) of the zooming operation is calculated based on the number of marks. This allows the microcomputer in the camera to perform an arithmetic computation regarding in which one of the ranges (L), (M), and (S) the camera zooming operation is concentrated or whether the operation is almost averaged in the ranges, with respect to the presence ratio for camerawork in predetermined possible events. Note that the difference by change in zooming ratio can be selected from among the following: the difference between absolute values of the change, the greatest difference in changes, and dispersion of the changes in a second.

FIG. 14(B) illustrates an example of this computation algorithm. The number of marks is represented by TS, TM, and TA respectively for the zooming operation ranges (S), (M), and (L). Note that the respective initial values are set to 10 (step S11).

The microcomputer measures the change in zooming ratio every second, and adds 1 to TS, TM, or TL upon each generation of the mark for TS, TM, or TL (step S12). Also, supposing the sum total of TS, TM, and TA to be A, the microcomputer calculates the (three) ratios r of TS, TM, and TL to A (step S13). If any one of the three ratios r is less than 0.05 or greater than 0.7, the microcomputer generates and displays a signal denoting such, for example, on the viewfinder (step S14). Thus, the camera operator can be notified of a bias of the zooming operation. Note that when TS, TM, and TL are 50 or more in total, they are each changed to 10 (step S15).

A list of expected probabilities for TS, TM, and TL is stored to a memory included in the camera, regarding each predetermined possible event, such as athletic meet, entrance ceremony, graduation ceremony, musical recital, trip, birthday party, and wedding ceremony, or any event to be freely set by the user, and for one event selected therefrom, whether the zooming operation is normal or biased is calculated, so that the camera operator can be notified thereof.

Next, a case where the shooter is notified of the degree of jiggle in camerawork will be described with reference to FIGS. 15 and 16. FIG. 15(A) is a graph illustrating temporal changes in vertical (horizontal) jiggle, e.g., outputs from the gyro sensor. In the figure, the horizontal axis denotes time, and the vertical axis denotes the amplitude of vertical (horizontal) jiggle. The graph of FIG. 15(A) is divided into three ranges in accordance with the jiggle amplitude denoted by the vertical axis (e.g., the amplitude taking an 8-bit value from 0 to 255).

Specifically, a vertical jiggle amplitude of up to 15-fold corresponds to range (S), a vertical jiggle amplitude from 16- to 63-fold corresponds to range (M), and a vertical jiggle amplitude of 64-fold or more corresponds to range (I). In the example of FIG. 15(A), the vertical jiggle amplitude first start in (I), and experiences a transition to (S), and a further transition through (M), (L), (M), and so on.

Here, changes in vertical jiggle amplitude are measured every 10 milliseconds (0.01 seconds) to allow calculation as to in which one of the ranges (L), (M), (S) dispersion of changes in jiggle during the current period is concentrated or whether it is almost averaged in the ranges, these calculations being performed by the microcomputer of the camera computing the presence ratio in the ranges (L), (M), (S) and the very changes in jiggle amplitude for the predetermined possible events.

FIG. 15(B) illustrates an exemplary distribution density concerning the jiggle. Dispersion of changes in jiggle at a predetermined possible event is taken as σ0, and dispersion of the changes in jiggle measured for the event is taken as σ1. By comparing σ0 and σ1 together, it is possible to determine whether the jiggle in camerawork is greater than or equal to a value set for the event, or whether the camerawork is rather static.

Therefore, the microcomputer compares the values σ0 and σ1, and based, on the result, a signal is generated to denote the jiggling status of the camerawork, for example, by an indication on the viewfinder. Concretely, the signal is generated to denote, for example, that the camerawork is almost standard if σ1 is less than 1.2 times σ0, the camerawork is slightly shakier than an expected standard if σ1 is equal to or greater than 1.2 times σ0 but less than 1.5 times, or the camerawork is significantly shakier than the expected standard if σ1 is equal to or greater than 1.5 times σ0. Furthermore, if σ1 is less than 0.7 times σ0, the signal is generated to denote that the camerawork is rather static. Thus, it is possible to inform the camera operator as to the degree of panning, tilting, or instability in the camerawork.

Figure 16:
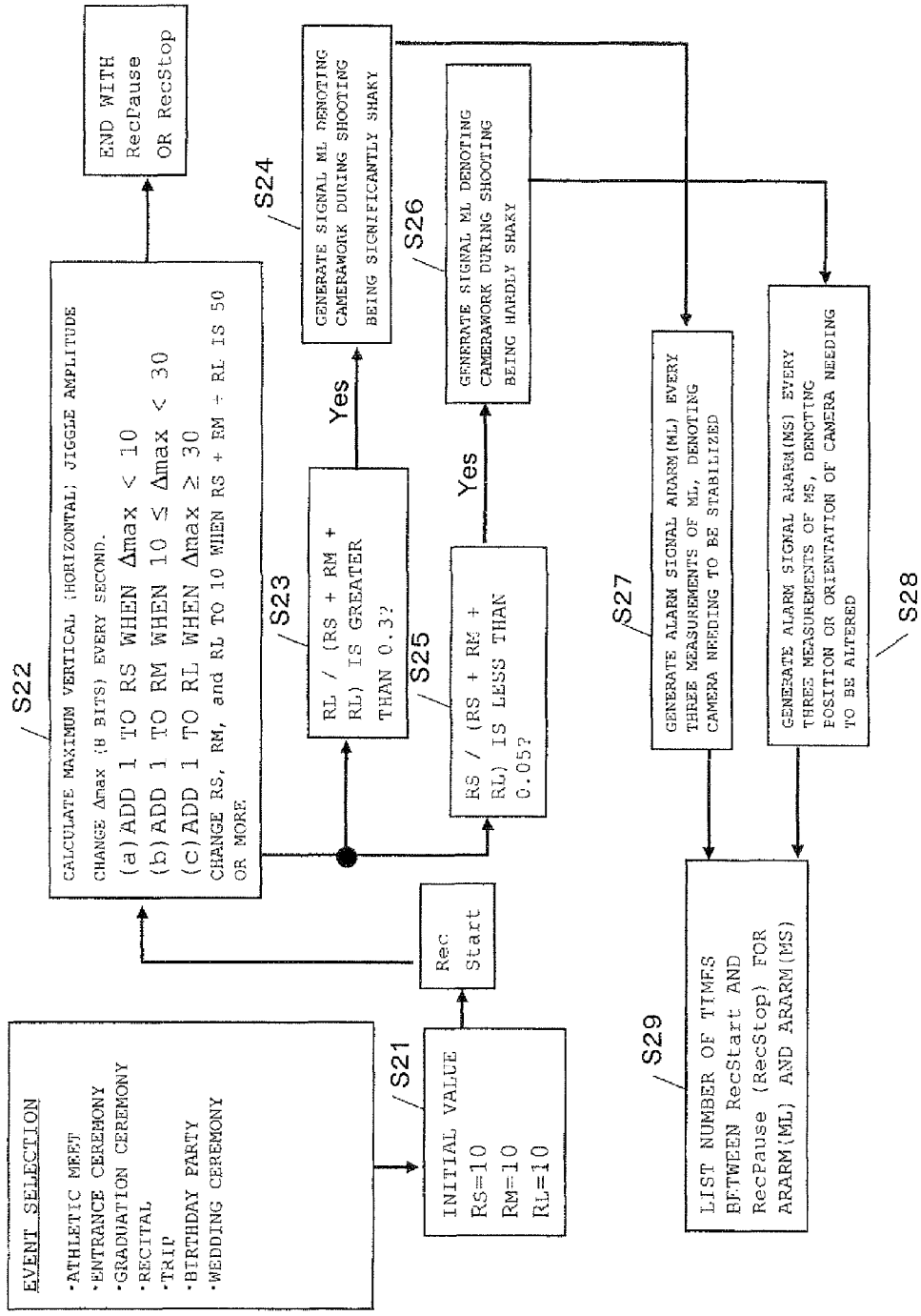
FIG. 16 is a diagram for explaining the function of the camerawork statistical means shown in FIG. 13.

FIG. 16 illustrates an exemplary algorithm for the camerawork statistical means 415 (camera microcomputer) to compute changes in jiggle amplitude. The maximum jiggle amplitude changes are represented by RL, RM, and RS respectively for ranges of: 30 or more (L); 10 or more but less than 30 (M); and less than 10 (S).

First, the respective initial values for RS, RM, and RL are set to 10 (step S21). The maximum jiggle amplitude change is measured every second (Δmax), so that classification into ranges (S), (M), and (L) is performed, and 1 is added to RS, RM, and RI upon each change (step S22).

Next, supposing the sum total of RS, RM, and RL to be A, the (two) ratios of RS and RI to A are calculated (steps S23 and S25). When the ratio RL to A is greater than 0.3 (step S23), a signal ML denoting that the camerawork during shooting is significantly shaky (rough camerawork) is generated (step S24). Also, when the ratio RS to A is less than 0.05 (step S25), a signal. MS denoting that the camerawork during shooting is hardly shaky (static camerawork) is generated (step S26). Then, it is indicated on, for example, the viewfinder. Thus, it is possible to inform the camera operator as to the degree of panning, tilting, or instability in the camerawork. Note that when RS+RM+RL are 50 or more, each of them is changed to 10 (step S22).

Note that an alarm signal may be generated every three measurements of ML after step S24, denoting that the camera needs to be stabilized (step S27). Similarly, an alarm signal may be generated every three measurements of MS after step S26, denoting that the position or orientation of the camera needs to be altered (step S28). Moreover, after these steps, the number of alarm signals between RecStart and RecPause (RecStop) may be listed (step S29).

Note that the camera microcomputer can perform computation based on both the signal for the jiggle dispersion σ described in conjunction with FIG. 15(B) and the signal for the jiggle amplitude changes described in conjunction with FIG. 16, making it possible to analyze the user camerawork in more detail.

As described above, the content shooting apparatus of the present embodiment makes it possible to obtain more well-balanced shot content not primarily consisting of zoomed-in images, panned images, or fixed images.

INDUSTRIAL APPLICABILITY

The present invention makes it possible to readily generate content and digests free from unnecessary portions, and therefore is applicable to apparatuses for shooting content as typified by, for example, homemade video.

The invention claimed is:

1. A content shooting apparatus for recording content containing video, audio, or data onto a recording medium, in combination with scene information for the content, and accessing a specific scene in the content with reference to the scene information, the apparatus comprising:
    a housing;
    a scene information generation section, supported by the housing, that detects an important scene and an unnecessary scene with reference to a parameter contained in operational control information for the shooting apparatus, the operational control information relating to camerawork including overall movement of the housing with respect to position and orientation direction and that generates the scene information for the important scene and the unnecessary scene;
    an auxiliary information assignment section, supported by the housing, that assigns the scene information for the important scene and the unnecessary scene its type, priority, start time, end time, or representative time as auxiliary information in accordance with a prescribed rule;
    a listing section, supported by the housing, that makes a list of the scene information for the important scene and the unnecessary scene and the auxiliary information thereof; and
    a scene sorting-out section, supported by the housing, that sorts out scenes from the content with reference to the priority after a recording operation to the recording medium, such that the number of scenes is within a predetermined range,
    wherein the unnecessary scene is deleted from the content by the scene sorting-out section, and wherein the priority is based on an assigned respective weighted priority level of metadata relating to said parameter contained in the operational control information, the operational control information comprising at least one of horizontal/vertical angular velocity information and forward-backward/rightward-leftward/upward-downward acceleration information.

2. The content shooting apparatus according to claim 1, wherein the scene sorting-out section includes at least one of a high priority scene sorting-out unit that sorts out the scene information in descending order of priority and a low priority scene sorting-out unit that sorts out the scene information in ascending order of priority.

3. The content shooting apparatus according to claim 2, wherein the high priority scene sorting-out unit sorts out high priority scenes from shot content having removed therefrom scenes sorted out by the low priority scene sorting-out unit.

4. The content shooting apparatus according to claim 1, further comprising:
    a setting unit that sets a method for selecting the scene information;
    a second-type priority section that computes a combination of plural pieces of scene information on the list in accordance with an arithmetic system determined by the setting unit, and assigning second-type priority to the scene information;
    an auxiliary information assignment section that assigns auxiliary information to the scene information, the auxiliary information being at least one of start time, end time, and representative time of a characteristic scene with the second-type priority; and
    a second-type priority list generation section that sorts out scene information from the list in descending order of second-type priority, such that the number of pieces of scene information is within a predetermined range, and generating a second-type priority list.

5. The content shooting apparatus according to claim 4, further comprising a second-type priority listing section that provides the second-type priority list to a file to be referenced for playing back the shot content.

6. The content shooting apparatus according to claim 5, further comprising a scene playback section that plays back characteristic scene sections in a specified order with reference to the second-type priority list.

7. The content shooting apparatus according to claim 5, further comprising a ticker display section that provides descriptions about characteristic scenes in characteristic scene sections, the descriptions being superimposed on playback video as tickers while playing back the characteristic scene sections in a specified order.

8. The content shooting apparatus according to claim 5, further comprising:
    a digest scheme specification section that receives a specification of at least one of the following items concerning characteristic scenes to be included in a digest: priority, type, digest time length, and content-to-digest reduction ratio;
    a generating section that generates the file to be referenced for playback in accordance with a digest generation scheme specified by the digest scheme specification unit, while referring to the second-type priority list, which is auxiliary data for the file to be referenced for playback; and a registration section that registers the file to be referenced for playback on a list of the content.

9. The content shooting apparatus according to claim 8, further comprising:
a file generation section that generates a file to be referenced for playing back a recommendation based on the file to be referenced for playback registered on the list of the content, the file to be referenced for recommendation playback consisting of scenes at a predetermined priority level or higher or scenes taken by specific camerawork; and
a registration section that registers the file to be referenced for recommendation playback with a recommended playback object list.

10. The content shooting apparatus according to claim 8, further comprising:
a generating section that generates background music when playing back the file to be referenced for playback registered on the list of the content; and
an alteration section that changes the background music in at least one of melody, tone, and tempo immediately before switching of characteristic scenes in the file to be referenced for playback.

11. The content shooting apparatus according to claim 5, further comprising a ticker display section that provides descriptions about characteristic scenes in characteristic scene sections, the descriptions being superimposed on playback video as tickers while playing back the characteristic scene sections with reference to the file to be referenced for playback.

12. The content shooting apparatus according to claim 5, further comprising:
a digest scheme specification section that receives a specification of at least one of the following items concerning characteristic scenes to be included in a digest: priority, type, digest time length, and content-to-digest reduction ratio; and
a file generation section that generates a file containing a collection of specified characteristic scenes in accordance with a digest generation scheme specified by the digest scheme specification unit, while referring to the second-type priority list, which is auxiliary data for the file to be referenced for playback.

13. The content shooting apparatus according to claim 5, further comprising:
a digest scheme specification section that receives a specification of at least one of the following items concerning characteristic scenes to be included in a digest: priority, type, digest time length, and content-to-digest reduction ratio; and
a playback section that plays back a string of unspecified characteristic scene sections in accordance with a digest generation scheme specified by the digest specification unit, while referring to the second-type priority list, which is auxiliary data for the file to be referenced for playback.

14. The content shooting apparatus according to claim 5, further comprising:
a digest scheme specification section that receives a specification of at least one of the following items concerning characteristic scenes to be included in a digest: priority, type, digest time length, and content-to-digest reduction ratio; and
a file generation section that generates a file obtained by collecting shot sections not specified at the time of playback, in accordance with a digest generation scheme specified by the digest scheme specification unit, while referring to the second-type priority list, which is auxiliary data for the file to be referenced for playback.

15. The content shooting apparatus according to claim 5, further comprising a playback section that performs playback with reference to the second-type priority list, which is auxiliary data for the file to be referenced for playback, such that sections specified at the time of playback are played back at normal speed, and shot sections not specified at the time of playback are played back at a "playback speed changed from normal" or with "playback video being additionally processed".

16. The content shooting apparatus according to claim 15, further comprising a playback/display that plays back shot video in slow motion, at high speed, in skip mode, or in still image display mode, wherein the playback is performed at the "playback speed changed from normal".

17. The content shooting apparatus according to claim 15, further comprising a video generation section that generates video by removing any horizontal and vertical jiggle due to camerawork from shot video, wherein the playback is performed with the "playback video being additionally processed".

18. The content shooting apparatus according to claim 4, further comprising a skip section that references the second-type priority list at the time of playback to skip from the start point, representative point, or end point of the characteristic scene to a referenced point.

19. The content shooting apparatus according to claim 1, wherein the operational control information comprises information relating to at least one of panning, tilting, and zooming of the content shooting apparatus.

20. The content shooting apparatus according to claim 1, wherein the operational control information for the shooting apparatus is at least one selected from the group consisting of horizontal/vertical absolute inclination information, horizontal/vertical angular velocity information, and forward-backward/rightward-leftward/upward-downward acceleration information.

21. The content shooting apparatus according to claim 1, wherein the camerawork includes one of panning, tilting, fixing, and zooming.

* * * * *